United States Patent
Sandhan et al.

(10) Patent No.: US 11,308,311 B2
(45) Date of Patent: Apr. 19, 2022

(54) ELECTRONIC DEVICE FOR OBTAINING FINGERPRINTS AND CONTROL METHOD THEREOF

(71) Applicant: Samsung Electronics Co., Ltd., Gyeonggi-do (KR)

(72) Inventors: Tushar Balasaheb Sandhan, Gyeonggi-do (KR); Hyeong-Wook Yang, Gyeonggi-do (KR); Hee-Kuk Lee, Gyeonggi-do (KR); Pil-Joo Yoon, Gyeonngi-do (KR); Hae-Dong Lee, Daegu (KR)

(73) Assignee: Samsung Electronics Co., Suwon-si (KR)

( * ) Notice: Subject to any disclaimer, the term of this patent is extended or adjusted under 35 U.S.C. 154(b) by 0 days.

(21) Appl. No.: 16/477,736
(22) PCT Filed: Jan. 18, 2018
(86) PCT No.: PCT/KR2018/000863
§ 371 (c)(1),
(2) Date: Jul. 12, 2019
(87) PCT Pub. No.: WO2018/135884
PCT Pub. Date: Jul. 26, 2018

(65) Prior Publication Data
US 2019/0362129 A1 Nov. 28, 2019

(30) Foreign Application Priority Data
Jan. 19, 2017 (KR) .......................... 10-2017-0009320

(51) Int. Cl.
*G06K 9/00* (2006.01)
*G06F 3/041* (2006.01)
*G06F 21/32* (2013.01)

(52) U.S. Cl.
CPC ......... *G06K 9/00087* (2013.01); *G06F 3/041* (2013.01); *G06F 21/32* (2013.01); *G06K 9/0004* (2013.01)

(58) Field of Classification Search
None
See application file for complete search history.

(56) References Cited

U.S. PATENT DOCUMENTS

2005/0105782 A1* 5/2005 Abiko ................ G06K 9/00026
382/124
2005/0244039 A1 11/2005 Geoffroy et al.
(Continued)

FOREIGN PATENT DOCUMENTS

EP 3 032 385 A1 6/2016
KR 2003-0008014 A 1/2003
(Continued)

OTHER PUBLICATIONS

Riley, et al.; "Instruction, Feedback and Biometrics: The User Interface for Fingerprint Authentication Systems"; 2009; IFIP International Federation for Information Processing.
(Continued)

*Primary Examiner* — Joseph R Haley
(74) *Attorney, Agent, or Firm* — Cha & Reiter, LLC.

(57) ABSTRACT

An electronic device according to various embodiments of the present invention comprises: a touch sensor; a fingerprint sensor that is formed in at least a partial area of the touch sensor and is capable of obtaining fingerprint information about an external object; and a processor, wherein the processor may be configured to: sense the movement of the external object by using the touch sensor while sensing the fingerprint information; when the movement satisfies a first designated condition, perform authentication on the external object by using the fingerprint information; and when the movement satisfies a second designated condition, stop the operation of sensing the fingerprint information and provide information related to the movement.

16 Claims, 28 Drawing Sheets

(56) References Cited

U.S. PATENT DOCUMENTS

| | | | |
|---|---|---|---|
| 2009/0166411 A1* | 7/2009 | Kramer | A61B 5/1172 |
| | | | 235/382 |
| 2010/0220900 A1 | 9/2010 | Orsley | |
| 2013/0076485 A1* | 3/2013 | Mullins | G06F 21/32 |
| | | | 340/5.83 |
| 2015/0070137 A1* | 3/2015 | Minteer | G06K 9/209 |
| | | | 340/5.83 |
| 2016/0148037 A1 | 5/2016 | Baek et al. | |
| 2016/0171281 A1* | 6/2016 | Park | G06F 3/044 |
| | | | 382/124 |
| 2016/0217314 A1 | 7/2016 | Kim et al. | |
| 2016/0224817 A1 | 8/2016 | Yang | |
| 2017/0061109 A1* | 3/2017 | Takenouchi | G06K 9/00013 |

FOREIGN PATENT DOCUMENTS

| | | |
|---|---|---|
| KR | 10-2008-0095336 A | 10/2008 |
| KR | 10-2014-0049705 A | 4/2014 |
| KR | 10-2016-0061163 A | 5/2016 |
| KR | 10-2016-0071887 A | 6/2016 |

OTHER PUBLICATIONS

European Search Report dated Dec. 4, 2019.

* cited by examiner

ELECTRONIC DEVICE FOR OBTAINING FINGERPRINTS AND CONTROL METHOD THEREOF

CROSS-REFERENCE TO RELATED APPLICATION(S)

This application is a National Phase Entry of PCT International Application No. PCT/KR2018/000863, which was filed on Jan. 18, 2018, and claims priority to Korean Patent Application No. 10-2017-0009320, which was filed on Jan. 19, 2017, the contents of which are incorporated herein by reference.

BACKGROUND

1. Field

Various embodiments of the disclosure relate to an electronic device for detecting a fingerprint and a control method thereof.

2. Description of the Related Art

Recently, disclosed is technology which allows an electronic device (e.g., a smartphone) to execute an application (e.g., a financial application) and acquire a user's biometric information (e.g., a fingerprint) so as to authenticate the access right to a particular function in the application.

Examples of such biometric information acquisition technology include a method for acquiring a user's fingerprint. For example, an electronic device may acquire a user's fingerprint through at least one sensor module included in the electronic device, and may authenticate the access right to a particular function within an application by using the acquired user's fingerprint.

SUMMARY

A conventional electronic device should perform a fingerprint detection operation during a relatively long period of time in order to relatively accurately acquire a user's fingerprint. In contrast, when a user's fingerprint is to be detected within a relatively short period of time, a user's fingerprint detected by an electronic device is forced to have low quality.

Various embodiments of the disclosure may provide fingerprint authentication technology which allows an electronic device to perform a procedure for detecting a user's fingerprint relatively accurately and within a relatively short period of time.

In accordance with an aspect of the disclosure, an electronic device may include: a touch sensor; a fingerprint sensor configured to be formed in at least a partial region of the touch sensor and be capable of acquiring fingerprint information of an external object; and a processor, wherein the processor is configured to: detect movement of the external object through the touch sensor while the fingerprint information is detected; when the movement satisfies a first designated condition, perform authentication of the external object by using the fingerprint information; and when the movement satisfies a second designated condition, stop an operation of detecting the fingerprint information and provide information related to the movement.

In accordance with another aspect of the disclosure, a control method of an electronic device may include: detecting a first fingerprint through a first sensor; detecting a touch region corresponding to the first fingerprint through a second sensor; and performing fingerprint authentication by using multiple first images acquired to correspond to the first fingerprint, according to the touch region.

In accordance with still another aspect of the disclosure, an electronic device may include: a first sensor configured to be capable of detecting a first fingerprint corresponding to a finger; a second sensor configured to be capable of detecting a second fingerprint corresponding to the finger and have a detection speed lower than that of the first sensor; and a processor configured to be electrically connected to the first sensor and the second sensor, wherein the processor is configured to: perform authentication of the first fingerprint detected using the first sensor while the second fingerprint is detected using the second sensor; and perform authentication of at least a part of the second fingerprint detected using the second sensor, according to a result of the authentication of the first fingerprint.

In accordance with yet another aspect of the disclosure, a control method of an electronic device may include: detecting a first fingerprint through a first sensor; performing authentication of the first fingerprint by using the first fingerprint; and performing authentication of at least a part of a second fingerprint detected using a second sensor, according to a result of the authentication of the first fingerprint.

In accordance with still yet aspect of the disclosure, an electronic device may include: a touch sensor configured to receive a touch input from a first external object; a fingerprint sensor configured to be formed in at least a partial region of the touch sensor and acquire fingerprint information of the first external object; and a processor configured to be electrically connected to the touch sensor and the fingerprint sensor, wherein the processor is configured to: detect a first variance of a region in which the touch input corresponding to the first external object is received while the fingerprint information of the first external object is acquired through the fingerprint sensor; when the detected first variance is less than a threshold, store at least one piece of the acquired fingerprint information of the first external object in a memory of the electronic device; and when the detected first variance is greater than or equal to the threshold, stop an operation of acquiring the fingerprint information of the first external object and provide information related to the detected first variance.

An electronic device according to various embodiments of the disclosure can acquire a fingerprint of high quality while detecting the fingerprint within a relatively short period of time.

According to various embodiments of the disclosure, a high-quality fingerprint is input into an electronic device within a short period of time, and thus a fingerprint recognition time and a fingerprint authentication time of an electronic device can be reduced. Further, a user can use an application having a low security level through authentication of a fingerprint within a short period of time, and can use an application having a high security level through authentication of a higher-quality fingerprint.

DETAILED DESCRIPTION

Figure 1:
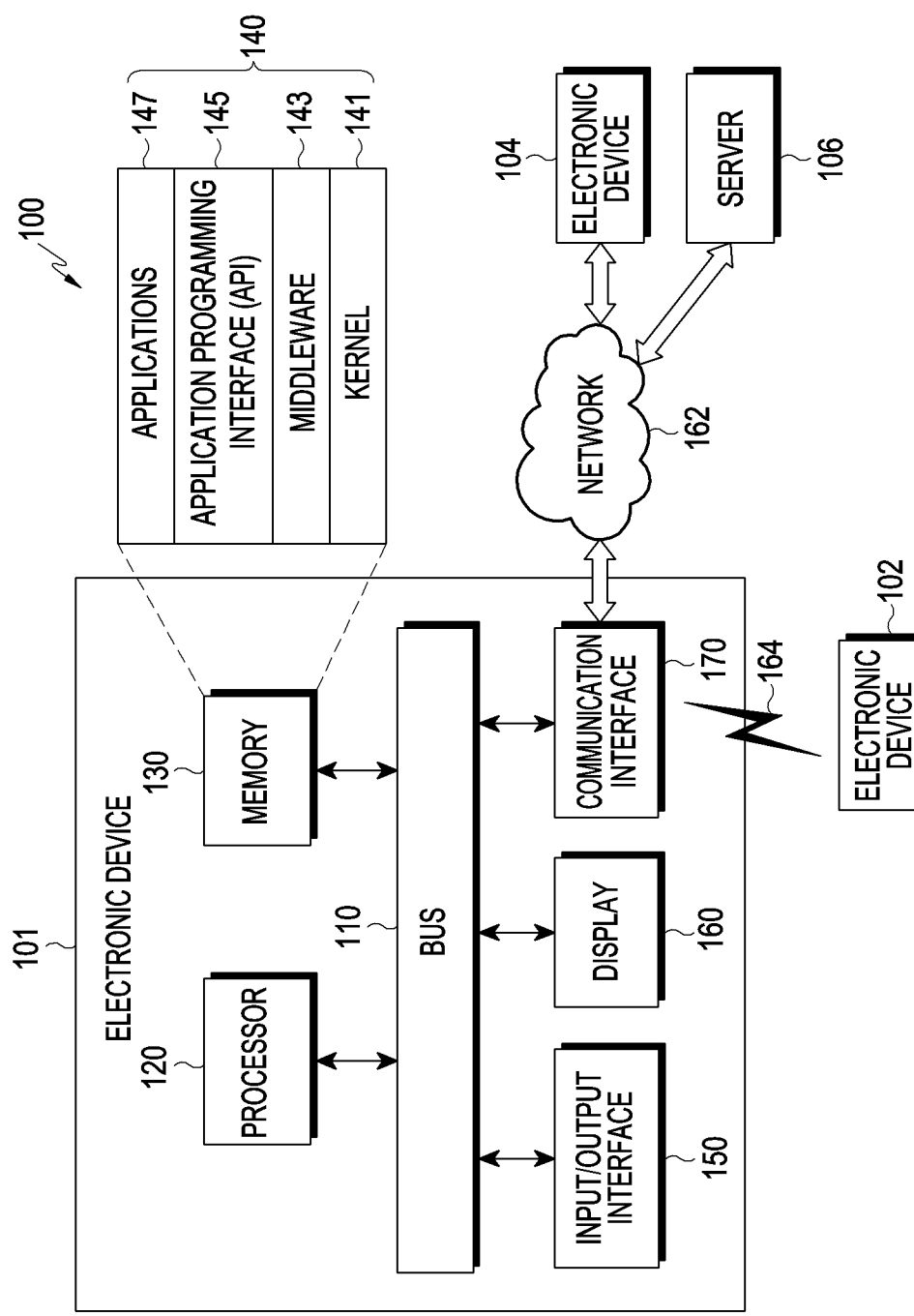
FIG. 1 is a diagram illustrating a use environment of multiple electronic devices according to various embodiments of the disclosure.

Hereinafter, various embodiments of the disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar elements. A singular expression may include a plural expression unless the context clearly indicates otherwise. In the disclosure, the expression "A or B" or "at least one of A and/or B" may include all possible combinations of items enumerated together. The expression "a first", "a second", "the first", or "the second" may modify corresponding elements regardless of the order or the importance thereof, and are used merely to distinguish each element from the others without unduly limiting the elements. When an element (e.g., first element) is referred to as being "(functionally or communicatively) connected", or "coupled" to another element (second element), the element may be connected directly to said another element or connected to the another element through yet another element (e.g., third element).

In the disclosure, the expression "configured to" may be used interchangeably with, for example, "suitable for", "having the capacity to", "adapted to", "made to", "capable of", or "designed to" in terms of hardware or software, according to circumstances. In some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a general-purpose processor (e.g., Central Processing Unit (CPU) or Application Processor (AP)) that can perform the corresponding operations by executing one or more software programs stored in a memory device.

An electronic device according to various embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), an MPEG-1 audio layer-3 (MP3) player, a medical device, a camera, and a wearable device. The wearable device may include at least one of an accessory type (e.g., a watch, a ring, a bracelet, an anklet, a necklace, glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a media box (e.g., Samsung HomeSync™, Apple TV™, or Google TV™, a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, a scanning machine, and an ultrasonic machine), a navigation device, a Global Navigation Satellite System (GNSS), an Event Data Recorder (EDR), a Flight Data Recorder (FDR), a Vehicle Infotainment Device, electronic devices for a ship (e.g., a navigation device for a ship, a gyro-compass, etc.), avionics, a security device, an automotive head unit, a robot for home or industry, a drone, an Automatic Teller Machine (ATM) in banks, a Point Of Sale (POS) device in a shop, and Internet-of-things devices (e.g., a light bulb, various sensors, a sprinkler device, a fire alarm, a thermostat, a streetlamp, a toaster, athletic equipment, a hot water tank, a heater, a boiler, etc.). According to some embodiments, an electronic device may include at least one of furniture, a part of a building/structure or car, an electronic board, an electronic signature receiving device, a projector, and various types of measuring instruments (e.g., a water meter, an electric meter, a gas meter, a radio wave meter, etc.). In various embodiments, the electronic device may be flexible, or may be a combination of two or more of the above-described various devices. The electronic device according to embodiments of the disclosure is not limited to the above-described devices. In the disclosure, the term "user" may indicate a person who uses an electronic device or a device (e.g., an artificial intelligence electronic device) using an electronic device.

An electronic device 101 within a network environment 100 according to various embodiments will be described with reference to FIG. 1. The electronic device 101 may include a bus 110, a processor 120, a memory 130, an input/output interface 150, a display 160, and a communication interface 170. In some embodiments, at least one of the elements of the electronic device 100 may be omitted therefrom, or the electronic device 100 may further include other elements. The bus 110 may include a circuit configured to interconnect the elements 110 to 170 and deliver communication (e.g., a control message or data) between the elements.

The processor 120 may include one or more of a Central Processing Unit (CPU), an Application Processor (AP), and a Communication Processor (CP). The processor 120, for example, may be configured to execute operations or data processing related to the control and/or communication of at least one other element of the electronic device 101.

The memory 130 may include a volatile and/or non-volatile memory. The memory 130 may be configured to store, for example, instructions or data related to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an "Operating System (OS)". The kernel 141 may control or manage, for example, system resources (e.g., the bus 110, the processor 120, and the memory 130) used to execute operations or functions implemented by other programs (e.g., the middleware 143, the API 145, and the application programs 147). Also, the kernel 141 may provide an interface through which the middleware 143, the API 145, or the application programs 147 may access the individual elements of the electronic device 101 so as to control or manage the system resources.

The middleware 143 may serve as, for example, an intermediary that enables the API 145 or the application programs 147 to communicate with the kernel 141 to exchange data. Also, the middleware 143 may process one or more task requests received from the application programs 147 according to the priorities of the task requests. For example, the middleware 143 may assign priorities which allow use of the system resources (e.g., the bus 110, the processor 120, the memory 130, etc.) of the electronic device 101 to one or more of the application programs 147, and may process the one or more task requests. The API 145 is an interface through which the applications 147 control functions provided by the kernel 141 or the middleware 143, and may include, for example, at least one interface or function (e.g., instruction) for file control, window control, image processing, text control, and the like. The input/output interface 150, for example, may be configured to deliver, to the other element(s) of the electronic device 101, commands or data input from a user or a different external device. Alternatively, the input/output interface 150 may be configured to output, to the user or the different external device, commands or data received from the other element(s) of the electronic device 101.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display, or the like. The display 160 may display, for example, various types of content (e.g., text, images, videos, icons, symbols, etc.) to a user. The display 160 may include a touch screen, and may receive, for example, a touch, gesture, proximity, or hovering input using an electronic pen or a part of a user's body. The communication interface 170 may be configured to establish, for example, communication between the electronic device 101 and an external device (e.g., a first external electronic device 102, a second external electronic device 104, or a server 106). For example, the communication interface 170 may be configured to be connected to a network 162 through wireless communication 164 or wired communication so as to communicate with the external device (e.g., the second external electronic device 104 or the server 106).

The wireless communication may use, for example, at least one of Long-Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), Global System for Mobile communications (GSM), and the like, as a cellular communication protocol. According to an embodiment, the wireless communication may include, for example, at least one of Wi-Fi, Bluetooth, Bluetooth Low Energy (BLE), Zigbee, Near Field Communication (NFC), magnetic secure transmission, Radio Frequency (RF), and Body Area Network (BAN). According to an embodiment, the wireless communication may include Global Navigation Satellite System (GNSS). The GNSS may include, for example, at least one of a Global Positioning System (GPS), a Global Navigation Satellite System (Glonass), a Beidou Navigation Satellite System (hereinafter, "Beidou"), and a European Global Satellite-based Navigation System (Galileo). Hereinafter, the "GPS" may be interchangeably used herein with the "GNSS". The wired communication may include, for example, at least one of a Universal Serial Bus (USB), a High Definition Multimedia Interface (HDMI), Recommended Standard 232 (RS-232), power line communication, a Plain Old Telephone Service (POTS), and the like. The network 162 may include at least one of a telecommunication network such as a computer network (e.g., a LAN or a WAN), the Internet, and a telephone network.

Each of the first and second external electronic devices 102 and 104 may be of a type identical to, or different from, that of the electronic device 101. According to various embodiments, all or some of the operations executed in the electronic device 101 may be executed in another electronic device or multiple electronic devices (e.g., the electronic devices 102 and 104 or the server 106). According to an embodiment, when the electronic device 101 has to perform some functions or services automatically or in response to a request, the electronic device 101 may request another device (e.g., the electronic device 102 or 104 or the server 106) to execute at least some functions relating thereto, instead of, or in addition to, executing the functions or services by itself. Said another electronic device (e.g., the electronic device 102 or 104 or the server 106) may execute the requested functions or the additional functions and may deliver an execution result to the electronic device 101. The electronic device 101 may process the received result as it is or additionally so as to provide the requested functions or services. To this end, cloud computing, distributed computing, or client-server computing technology may be used.

Figure 2:
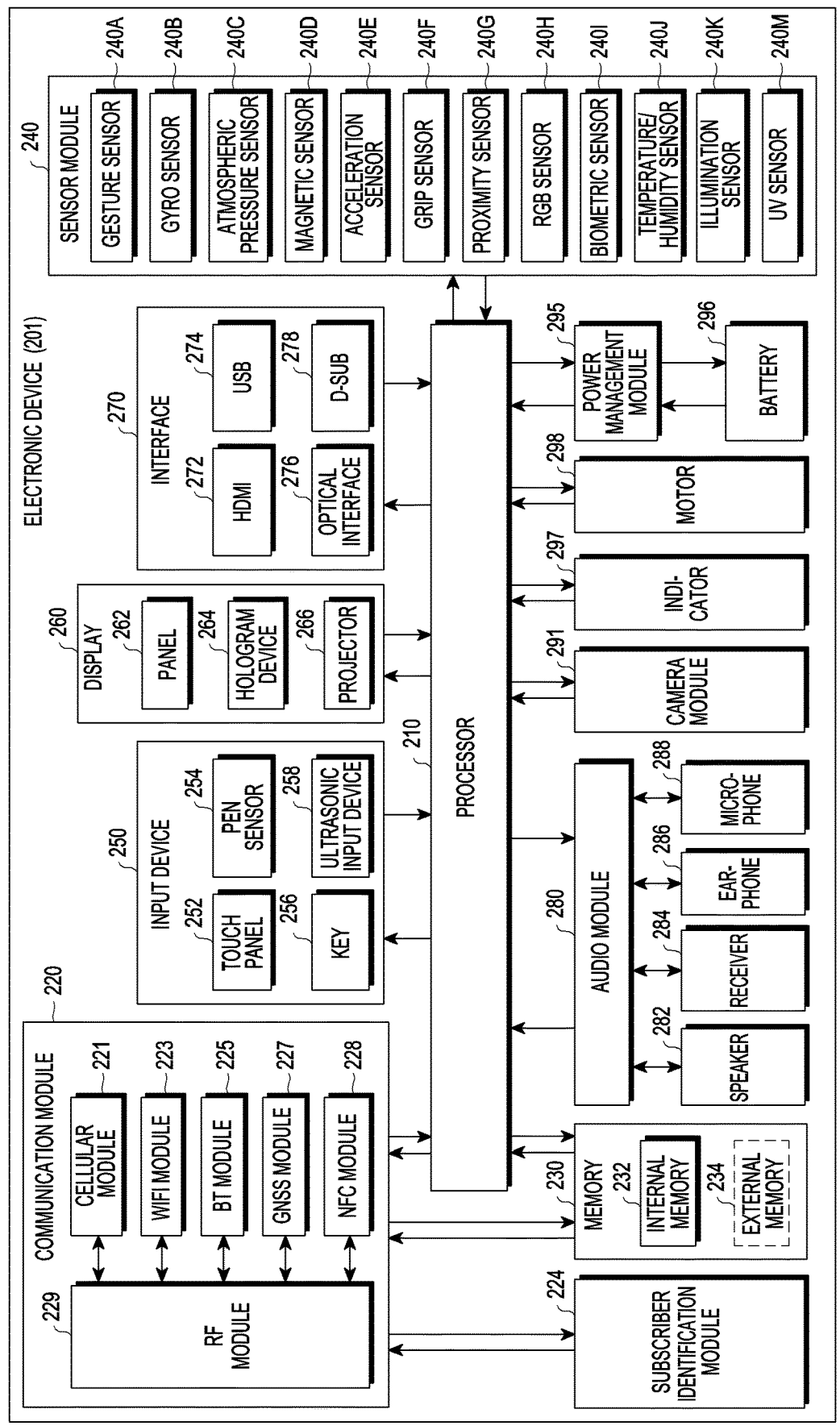
FIG. 2 is a block diagram of an electronic device according to various embodiments of the disclosure.

FIG. 2 is a block diagram illustrating an electronic device 201 according to various embodiments. The electronic device 201 may include, for example, the entirety, or a part, of the electronic device 101 illustrated in FIG. 1. The electronic device 201 may include at least one processor (e.g., an AP) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210, for example, may be configured to drive an operating system or application programs to control multiple hardware or software elements connected thereto, and perform various types of data processing and operations. The processor 210 may be implemented by, for example, a System on Chip (SoC). According to an embodiment, the processor 210 may further include a Graphic Processing Unit (GPU) and/or an image signal processor. The processor 210 may include at least some (e.g., a cellular module 221) of the elements illustrated in FIG. 2. The processor 210 may load, into a volatile memory, commands or data received from at least one of the other elements (e.g., a non-volatile memory) to process the same, and may store resulting data in the non-volatile memory.

The communication module 220 may have a configuration identical or similar to that of the communication interface (e.g., the communication interface 170) illustrated in FIG. 1. The communication module 220 may include, for example, the cellular module 221, a Wi-Fi module 223, a Bluetooth module 225, a GNSS module 227, an NFC module 228, and an RF module 229. The cellular module 221 may provide, for example, a voice call, a video call, a text message service, an Internet service, and the like through a communication network. According to an embodiment, the cellular module 221 may identify and authenticate the electronic device 201 within a communication network by using the subscriber identification module (e.g., a SIM card) 224. According to an embodiment, the cellular module 221 may perform at least some of the functions that the processor 210 may provide. According to an embodiment, the cellular module 221 may include a Communication Processor (CP). According to some embodiments, at least some (e.g., two or more) of the cellular module 221, the Wi-Fi module 223, the Bluetooth module 225, the GNSS module 227, and the NFC module 228 may be included in one Integrated Chip (IC) or IC package. The RF module 229 may transmit or receive, for example, a communication signal (e.g., an RF signal). The RF module 229 may include, for example, a transceiver, a Power Amplifier Module (PAM), a frequency filter, a Low Noise Amplifier (LNA), an antenna, and the like. According to another embodiment, at least one of the cellular module 221, the Wi-Fi module 223, the Bluetooth module 225, the GNSS module 227, and the NFC module 228 may transmit or receive an RF signal through a separate RF module. The subscriber identification module 224 may include, for example, a card or an embedded SIM including a subscriber identification module, and may include unique identify information (e.g., an Integrated Circuit Card Identifier (ICCID)) or subscriber information (e.g., an International Mobile Subscriber Identity (IMSI)).

The memory 230 (e.g., the memory 130) may include, for example, an internal memory 232 or an external memory 234. The internal memory 232 may include, for example, at least one of: a volatile memory (e.g., a Dynamic Random Access Memory (DRAM), a Static RAM (SRAM), or a Synchronous DRAM (SDRAM)); and a nonvolatile memory (e.g., a One-Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory, a hard drive, or a Solid-State Drive (SSD)). The external memory 234 may include a flash drive, for example, Compact Flash (CF), Secure Digital (SD), Micro Secure Digital (Micro-SD), Mini Secure Digital (Mini-SD), extreme Digital (xD), a Multi-Media Card (MMC), or a memory stick. The external memory 234 may be functionally or physically connected to the electronic device 201 through various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (e.g., a Red, Green, and Blue (RGB) sensor), a biometric sensor 240I, a temperature/humidity sensor 240J, an illuminance sensor 240K, and an Ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit configured to control at least one sensor included therein. In some embodiments, the electronic device 201 may further include a processor configured to control the sensor module 240 as a part of the processor 210 or separately from the processor 210, so as to control the sensor module 240 while the processor 210 is in a sleep state.

The input device 250 may include, for example, a touch panel 252, a (digital) pen sensor 254, a key 256, or an ultrasonic input unit 258. The touch panel 252 may use, for example, at least one of capacitive, resistive, infrared, and ultrasonic methods. Also, the touch panel 252 may further include a control circuit. The touch panel 252 may further include a tactile layer to provide, to a user, a tactile reaction. The (digital) pen sensor 254 may include, for example, a recognition sheet that is a part of the touch panel or is separate from the touch panel. The key 256 may include, for example, a physical button, an optical key, or a keypad. The ultrasonic input device 258 may detect an ultrasonic wave generated by an input tool through a microphone (e.g., a microphone 288), and may check data corresponding to the detected ultrasonic wave.

The display 260 (e.g., the display 160) may include a panel 262, a hologram device 264, a projector 266, and/or a control circuit configured to control them. The panel 262 may be implemented to be, for example, flexible, transparent, or wearable. The panel 262, together with the touch panel 252, may be implemented as at least one module. According to an embodiment, the panel 262 may include a pressure sensor (or force sensor) capable of measuring the strength of a pressure by the user's touch. The pressure sensor may be implemented in a single body with the touch panel 252, or may be implemented by one or more sensors separate from the touch panel 252. The hologram device 264 may show a three-dimensional image in the air by using an interference of light. The projector 266 may display an image by projecting light onto a screen. The screen may be, for example, located inside or outside of the electronic device 201. The interface 270 may include, for example, a High-Definition Multimedia Interface (HDMI) 272, a Universal Serial Bus (USB) 274, an optical interface 276, or a D-subminiature (D-sub) 278. The interface 270 may be included, for example, in the communication interface 20 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data association (IrDA) standard interface.

The audio module 280 may convert, for example, a sound signal into an electrical signal, and vice versa. At least some elements of the audio module 280 may be included, for example, in the input/output interface 145 illustrated in FIG. 1. The audio module 280 may process sound information that is input or output through, for example, a speaker 282, a receiver 284, an earphone 286, the microphone 288, or the like. The camera module 291 is, for example, a device capable of capturing a still image and a moving image. According to an embodiment, the camera module 291 may include one or more image sensors (e.g., a front sensor or a rear sensor), a lens, an Image Signal Processor (ISP), or a flash (e.g., an LED or a xenon lamp). The power management module 295 may manage, for example, power of the electronic device 201. According to an embodiment, the power management module 295 may include a Power Management Integrated Circuit (PMIC), a charger Integrated Circuit (IC), or a battery or fuel gauge. The PMIC may have a wired and/or wireless charging method. Examples of the wireless charging method may include a magnetic resonance method, a magnetic induction method, an electromagnetic wave method, and the like, and an additional circuit, such as a coil loop, a resonance circuit, or a rectifier, may be further included for wireless charging. The battery gauge may measure, for example, a residual quantity of the battery 296, and a voltage, current, or temperature thereof while the battery is charged. The battery 296 may include, for example, a rechargeable battery and/or a solar battery.

The indicator 297 may indicate a particular state (e.g., a booting state, a message state, or a charging state) of the electronic device 201 or a part (e.g., the processor 210) thereof. The motor 298 may convert an electrical signal into a mechanical vibration and may generate a vibration, a haptic effect, and the like. The electronic device 201 may include a mobile TV supporting device (e.g., a GPU) capable of processing media data according to, for example, Digital Multimedia Broadcasting (DMB), Digital Video Broadcasting (DVB), or MediaFlo™ standards. Each of the above-described elements according to the disclosure may include one or more components, and the names of the corresponding elements may vary with the type of electronic device. In various embodiments, some elements may be omitted from the electronic device (e.g., the electronic device 201) or additional elements may be further included therein, or some of the elements may be combined into a single entity that may perform functions identical to those of the relevant elements before combined.

Figure 3:
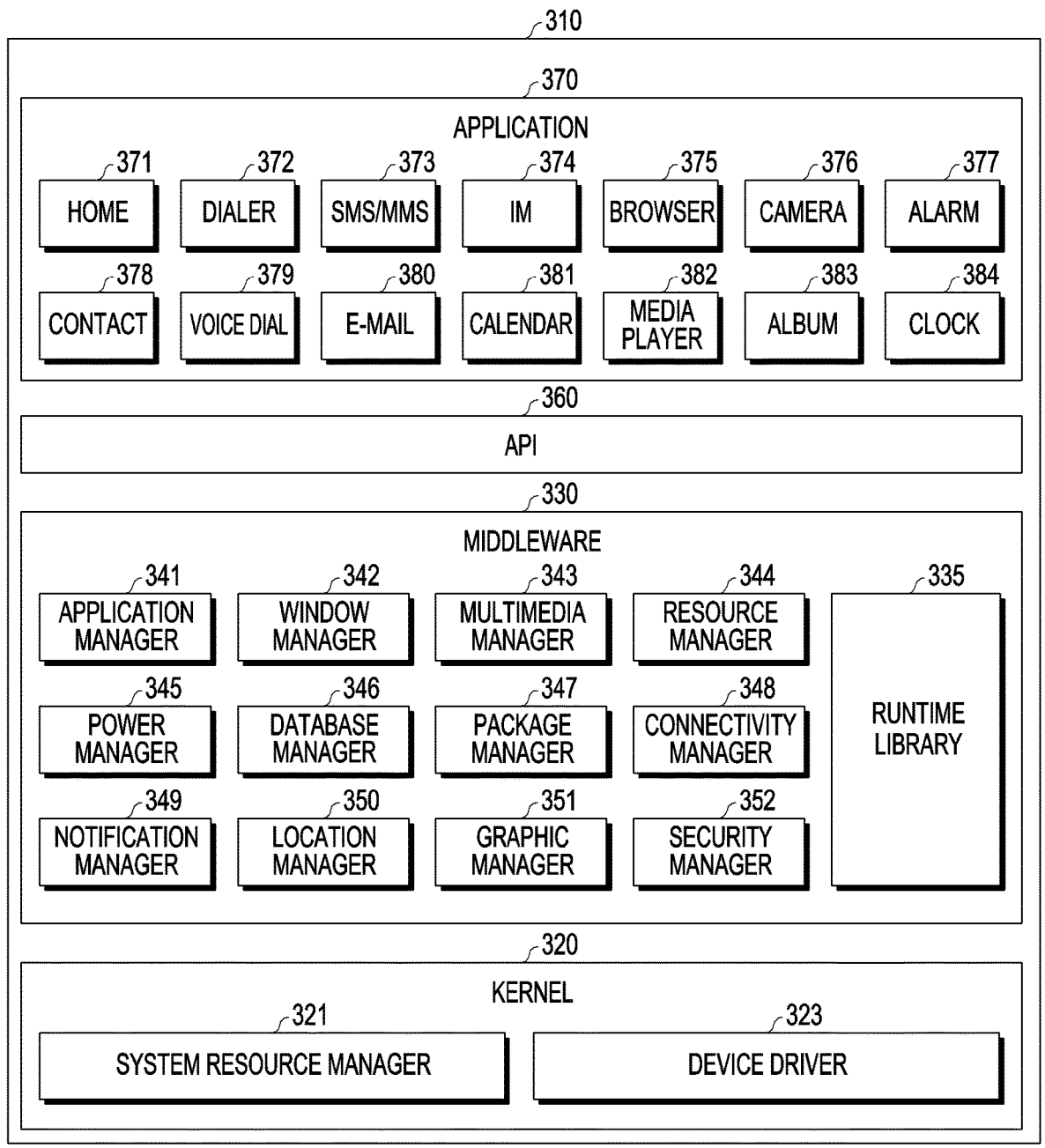
FIG. 3 is a block diagram of a program module according to various embodiments.

FIG. 3 is a block diagram illustrating a program module according to various embodiments. According to an embodiment, the program module 310 (e.g., the program 140) may include an operating system that controls resources related to an electronic device (e.g., the electronic device 101) and/or various applications (e.g., the application programs 147) executed on the operating system. The operating system may be, for example, Android™, iOS™, Windows™, Symbian™, Tizen™, or Bada™. Referring to FIG. 3, the program module 310 may include a kernel 320 (e.g., the kernel 141), middleware 330 (e.g., the middleware 143), an API 360 (e.g., the API 145), and/or an application 370 (e.g., the application program 147). At least a part of the program module 310 may be preloaded on the electronic device, or may be downloaded from an external electronic device (e.g., the electronic device 102 or 104 or the server 106).

The kernel 320 may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth driver, a shared-memory driver, a USB driver, a keypad driver, a Wi-Fi driver, an audio driver, or an Inter-Process Communication (IPC) driver. The middleware 330 may provide, for example, a function which the application 370 needs in common, or may provide various functions to the application 370 through the API 360 so that the application 370 can use limited system resources in the electronic device. According to an embodiment, the middleware 330 may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a compiler to add a new function through a programming language while the applications 370 are executed. The runtime library 335 may perform input/output management, memory management, or arithmetic function processing. The application manager 341 may manage, for example, the life cycle of the application 370. The window manager 342 may manage GUI resources used on a screen. The multimedia manager 343 may detect a format necessary to reproduce media files, and may encode or decode media files by using a coder/decoder (codec) appropriate for the relevant format. The resource manager 344 may manage a source code or memory space of the application 370. The power manager 345 may manage, for example, the capacity of a battery or power, and may provide power information necessary for an operation of an electronic device. According to an embodiment, the power manager 345 may interwork with a Basic Input/Output System (BIOS). The database manager 346 may, for example, generate, search, or change a database to be used in the applications 370. The package manager 347 may manage installation or update of an application distributed in the form of a package file.

The connectivity manager 348 may manage, for example, wireless connectivity. The notification manager 349 may provide a user with an event, for example, arrival message, promise, or proximity notification. The location manager 350 may manage, for example, location information of the electronic device. The graphic manager 351 may manage, for example, a graphic effect to be provided to a user and a user interface related thereto. The security manager 352 may provide, for example, system security or user authentication. According to an embodiment, the middleware 330 may include a telephony manager for managing a voice or video call function of the electronic device or a middleware module capable of forming a combination of the functions of the above-described elements. According to an embodiment, the middleware 330 may provide a module specialized according to the type of operating system. The middleware 330 may dynamically remove some of the existing elements, or may add new elements thereto. The API 360 may be a set of, for example, API programming functions and may have different configurations depending on operating systems. For example, in the case of Android or iOS, one API set may be provided for each platform, and in the case of Tizen, two or more API sets may be provided for each platform.

The application 370 may include an application that provides, for example, a home 371, a dialer 372, an SMS/MMS 373, an Instant Message (IM) 374, a browser 375, a camera 376, an alarm 377, a contact 378, a voice dial 379, an e-mail 380, a calendar 381, a media player 382, an album 383, and a watch 384, health care (e.g., measuring an exercise quantity or blood sugar), or environmental information (e.g., atmospheric pressure, humidity, or temperature information). According to an embodiment, the application 370 may include an information exchange application capable of supporting information exchange between the electronic device and an external electronic device. Examples of the information exchange application may include a notification relay application for delivering particular information to the external electronic device, or a device management application for managing the external electronic device. For example, the notification relay application may deliver notification information generated by another application of the electronic device to the external electronic device, or may receive notification information from the external electronic device and provide the received notification information to the user. For example, the device management application may install, delete, or update a function (e.g., turning-on/turning-off the external electronic device itself (or some elements) or adjusting the brightness (or resolution) of the display) of the external electronic device communicating with the electronic device or an application operating on the external electronic device. According to an embodiment, the application 370 may include an application (e.g., a health-care application of a mobile medical device) designated according to an attribute of the external electronic device. According to an embodiment, the application 370 may include an application received from the external electronic device. At least a part of the program module 310 may be implemented (e.g., executed) in software, firmware, hardware (e.g., the processor 210), or as a combination of at least two or more thereof, and may include a module, program, routine, instruction set, or process for performing one or more functions.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Array (FPGA), or a programmable-logic device, which performs certain operations and has been known or is to be developed in the future. At least some of devices (e.g., modules or functions thereof) or methods (e.g., operations) according to various embodiments may be implemented by an instruction which is stored a computer-readable storage medium (e.g., the memory 130) in the form of a program module. When the instruction is executed by a processor (e.g., the processor 120), the processor may perform a function corresponding to the instruction. Examples of the computer-readable storage medium may include a hard disk, a floppy disk, a magnetic medium (e.g., a magnetic tape), an optical media (e.g., CD-ROM, DVD), a magneto-optical media (e.g., a floptical disk), an inner memory, and the like. The instruction may include a code made by a complier or a code executable by an interpreter. A module or a program module according to various embodiments may include one or more of the above-described components or may further include other additional components, or some of the above-described components may be omitted therefrom. The operations performed by modules, program modules, or other elements according to various embodiments may be performed in a sequential, parallel, repetitive, or heuristic manner, and at least some of the operations may be performed in different orders or omitted, or other operations may be added thereto.

An electronic device (e.g., the electronic device 101 or 201) according to various embodiments of the disclosure may include: a touch sensor (e.g., the touch panel 252); a fingerprint sensor (e.g., the sensor module 240) configured to be formed in at least a partial region of the touch sensor and be capable of acquiring fingerprint information of an external object; and a processor (e.g., the processor 120 or 210), wherein the processor is configured to: detect movement of the external object through the touch sensor while the fingerprint information is detected; when the movement satisfies a first designated condition, authenticate the external object by using the fingerprint information; and when the movement satisfies a second designated condition, stop an operation of detecting the fingerprint information and provide information related to the movement.

The processor of the electronic device according to various embodiments of the disclosure may be configured to: detect multiple reference images of another external object through the fingerprint sensor; and store the multiple reference images detected through the fingerprint sensor.

The processor of the electronic device according to various embodiments of the disclosure may be configured to acquire multiple first images of the external object when the movement satisfies the second designated condition.

The processor of the electronic device according to various embodiments of the disclosure may be configured to perform fingerprint authentication of the external object by using the multiple reference images and the multiple first images.

The processor of the electronic device according to various embodiments of the disclosure may be configured to acquire a variance of the movement of the external object on the basis of the detected movement of the external object, the first condition may correspond to a case in which the acquired variance is less than or equal to a threshold variance, and the second condition may correspond to a case in which the acquired variance is greater than the threshold variance.

The electronic device (e.g., the electronic device 101 or 201) according to various embodiments of the disclosure may include: a first sensor (e.g., the sensor module 240) configured to be capable of detecting a first fingerprint corresponding to a finger; a second sensor (e.g., the sensor module 240) configured to be capable of detecting a second fingerprint corresponding to the finger and have a detection speed lower than that of the first sensor; and a processor (e.g., the processor 120 or 210) configured to be electrically connected to the first sensor and the second sensor, wherein the processor is configured to: perform authentication of the first fingerprint detected through the first sensor while the second fingerprint is detected through the second sensor; and perform authentication of at least a part of the second fingerprint detected through the second sensor, according to a result of the authentication of the first fingerprint.

The processor of the electronic device according to various embodiments of the disclosure may be configured to stop an operation of detecting the second fingerprint, on the basis of the result of the authentication of the first fingerprint which satisfies the first condition.

The processor of the electronic device according to various embodiments of the disclosure may be configured to perform authentication of at least a part of the second fingerprint detected through the second sensor, on the basis of the result of the authentication of the first fingerprint which does not satisfy the first condition.

The processor of the electronic device according to various embodiments of the disclosure may be configured to perform authentication of at least a part of the second fingerprint, according to a similarity between the first fingerprint and a pre-stored reference fingerprint.

The processor of the electronic device according to various embodiments of the disclosure may be configured to perform authentication of at least a part of the second fingerprint when the similarity is greater than or equal to a first similarity value.

The processor of the electronic device according to various embodiments of the disclosure may be configured to activate the second sensor and start detection of the second fingerprint before authentication of the first fingerprint is performed, on the basis of a state-of-charge of a battery.

The processor of the electronic device according to various embodiments of the disclosure may be configured to activate the second sensor and start detection of the second fingerprint before authentication of the first fingerprint is performed, when the state-of-charge of the battery is greater than a threshold voltage value.

The processor of the electronic device according to various embodiments of the disclosure may be configured to perform authentication of at least a part of the second fingerprint, according to a security level of an application in which authentication of the first fingerprint has been requested.

The processor of the electronic device according to various embodiments of the disclosure may be configured to, when the application has a security level lower than a threshold level, perform first additional authentication by using the first fingerprint and the at least a part of the second fingerprint, according to the similarity between the first fingerprint and the pre-stored reference fingerprint.

The processor of the electronic device according to various embodiments of the disclosure may be configured to perform the first additional authentication when the similarity is less than or equal to a second similarity value.

The processor of the electronic device according to various embodiments of the disclosure may be configured to perform second additional authentication by using the first fingerprint and the at least a part of the second fingerprint, according to a result of the first additional authentication.

The processor of the electronic device according to various embodiments of the disclosure may be configured to perform the second additional authentication when a similarity between the reference fingerprint and a third fingerprint, obtained by synthesizing the first fingerprint and the at least a part of the second fingerprint, is less than or equal to a third similarity value.

The processor of the electronic device according to various embodiments of the disclosure may be configured to perform the second additional authentication when a similarity, which reflects the similarity between the first fingerprint and the reference fingerprint and a similarity between the at least a part of the second fingerprint and the reference fingerprint, is less than or equal to the third similarity value.

The processor of the electronic device according to various embodiments of the disclosure may be configured to perform additional authentication by using the second fingerprint and the first fingerprint when the application has a security level higher than the threshold level.

The processor of the electronic device according to various embodiments of the disclosure may be configured to perform authentication of at least a part of the second fingerprint according to whether a configured timer expires, when the application has a security level lower than the threshold level.

The processor of the electronic device according to various embodiments of the disclosure may be configured to perform authentication of at least a part of the second fingerprint when the timer has expired.

The processor of the electronic device according to various embodiments of the disclosure may be configured to determine an expiration time of the timer according to a state-of-charge of a battery.

The processor of the electronic device according to various embodiments of the disclosure may be configured to perform authentication of at least a part of the second fingerprint when the application has a security level higher than the threshold level.

The processor of the electronic device according to various embodiments of the disclosure may be configured to display a fingerprint region adjustment guide when the authentication of the at least a part of the second fingerprint has failed.

The processor of the electronic device according to various embodiments of the disclosure may be configured to display the fingerprint region adjustment guide according to whether the second sensor is disposed between the first sensor and a housing of the electronic device.

The processor of the electronic device according to various embodiments of the disclosure may be configured to display the fingerprint region adjustment guide when the second sensor is disposed between the first sensor and the housing of the electronic device.

The processor of the electronic device according to various embodiments of the disclosure may be configured to display the fingerprint region adjustment guide according to a result of comparison between the first fingerprint and the second fingerprint.

The processor of the electronic device according to various embodiments of the disclosure may be configured to display the fingerprint region adjustment guide when a similarity between the first fingerprint and the second fingerprint is greater than or equal to a fourth similarity value.

The processor of the electronic device according to various embodiments of the disclosure may be configured to display the fingerprint region adjustment guide according to a similarity between the second fingerprint and the pre-stored reference fingerprint.

The processor of the electronic device according to various embodiments of the disclosure may be configured to display the fingerprint region adjustment guide when the similarity between the second fingerprint and the pre-stored reference fingerprint is greater than a fifth similarity value.

An electronic device (e.g., the electronic device 101 or 201) according to various embodiments of the disclosure may include: a touch sensor (e.g., the touch panel 252) configured to receive a touch input from a first external object; a fingerprint sensor (e.g., the sensor module 240) configured to be formed in at least a partial region of the touch sensor and acquire fingerprint information of the first external object; and a processor (e.g., the processor 120 or 210) configured to be electrically connected to the touch sensor and the fingerprint sensor, wherein the processor is configured to: detect a first variance of a region in which the touch input corresponding to the first external object is received while the fingerprint information of the first external object is acquired through the fingerprint sensor; when the detected first variance is less than a threshold, store at least one piece of the acquired fingerprint information of the first external object in a memory of the electronic device; and when the detected first variance is greater than or equal to the threshold, stop an operation of acquiring the fingerprint information of the first external object and provide information related to the detected first variance.

The processor of the electronic device according to various embodiments of the disclosure may be configured to: detect a second variance of a region, in which a touch input corresponding to a second external object is received, while fingerprint information of the second external object is acquired through the fingerprint sensor; when the detected second variance is less than a threshold, compare the fingerprint information of the second external object with at least one piece of fingerprint information of the first external object stored in the memory so as to authenticate the fingerprint information of the second external object; and when the detected second variance is greater than or equal to the threshold, stop an operation of acquiring the fingerprint information of the second external object and provide information related to the detected second variance.

The processor of the electronic device according to various embodiments of the disclosure may be configured to acquire multiple images of the second external object when the detected second variance is greater than or equal to the threshold.

The processor of the electronic device according to various embodiments of the disclosure may be configured to authenticate the fingerprint information of the second external object by using the multiple images of the second external object and the at least one piece of fingerprint information of the first external object.

For example, in the following specification, the expression "multiple images or multiple fingerprints coincide with each other" may include the meaning that a coincidence degree between multiple images or multiple fingerprints is greater than a designated threshold.

Figure 4:
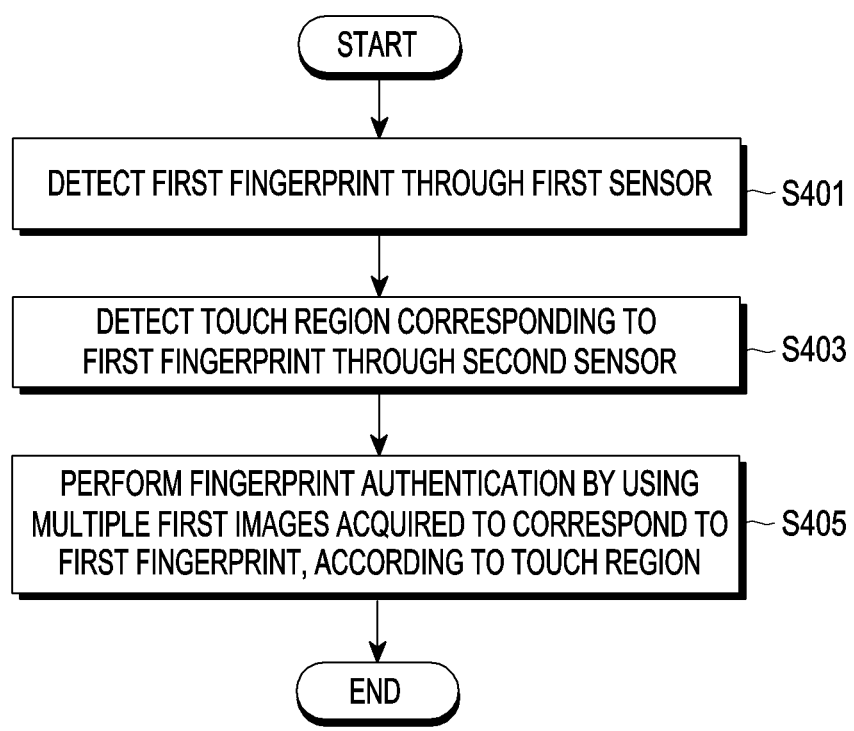
FIG. 4 illustrates a control method of an electronic device according to an embodiment.

FIG. 4 illustrates a control method of an electronic device according to an embodiment.

For example, a first sensor and/or a second sensor may be a biometric sensor configured in at least a partial region of a display (e.g., the display 160) so as to recognize biometric information (e.g., fingerprint information). For example, the first sensor and/or the second sensor may include one or more sensors among the at least one sensor 240A to 240M included in the sensor module (e.g., the sensor module 240) of FIG. 2. For example, the first sensor may be the biometric sensor 240I and/or the temperature/humidity sensor 240J among the at least one sensor 240A to 240 M, and the second sensor may be a touch sensor included in the touch panel 252 within the input device 250.

As illustrated in FIG. 4, according to an embodiment, in operation S401, a processor (e.g., the processor 120) may detect a first fingerprint through the first sensor.

For example, after a particular application is executed, in the application, the processor 120 may activate the first sensor in order to detect a user's fingerprint, in response to a fingerprint input of the user and may detect the first fingerprint through the first sensor.

According to an embodiment, in operation S403, the processor 120 may detect a touch region corresponding to the first fingerprint through the second sensor.

For example, the processor 120 may detect a touch region corresponding to a region in which the first sensor activated to detect the user's fingerprint detects the first fingerprint.

For example, the touch region may be larger than a region in which the first sensor detects the first fingerprint.

For example, a first time required to start detection of the first fingerprint through the first sensor and complete the detection thereof may be greater than a second time required to detect the touch region through the second sensor.

The first time may be equal to, for example, 800 ms and the second time may be equal to, for example, 50 ms.

According to an embodiment, in operation S405, the processor 120 may perform fingerprint authentication by using multiple first images acquired to correspond to the first fingerprint at every first time interval according to the touch region.

For example, a memory (e.g., the memory 130) may store multiple first images generated at every predesignated first time interval during an entire time required for the first sensor to start detection of the first fingerprint and complete the detection thereof.

For example, the processor 120 may compare the multiple first images stored in the memory 130 with multiple pre-stored reference images generated at every first time interval, and may perform fingerprint authentication on the basis of whether the multiple first images coincide with the multiple pre-stored reference images.

A control method of an electronic device according to various embodiments of the disclosure may include: detecting a first fingerprint through a first sensor; detecting a touch region corresponding to the first fingerprint through a second sensor; and performing fingerprint authentication by using multiple first images acquired to correspond to first fingerprint, according to the touch region.

According to various embodiments, the control method may include performing the fingerprint authentication according to a variance of the touch region.

According to various embodiments, the control method may include performing the fingerprint authentication by using the first fingerprint when the variance is less than or equal to a threshold variance.

According to various embodiments, the control method may include, when the variance is greater than or equal to the threshold variance, performing the fingerprint authentication by using the first fingerprint or the multiple first images, according to a security level of an application in which the fingerprint authentication has been requested.

According to various embodiments, the control method may include performing the fingerprint authentication by using the first fingerprint or the multiple first images, according to a similarity between the multiple first images and multiple reference images generated at every first time interval so as to correspond to a pre-stored reference fingerprint.

According to various embodiments, the control method may include performing the fingerprint authentication by using the first fingerprint when the similarity is greater than or equal to a set first similarity value.

According to various embodiments, the control method may include performing the fingerprint authentication by using the multiple first images when the similarity has a value between a set second similarity value and the first similarity value.

According to various embodiments, the control method may include performing the fingerprint authentication by using a result of comparison between at least one reference change image representing a difference between multiple reference images and at least one first change image representing a difference between the multiple first images.

Figure 5A:
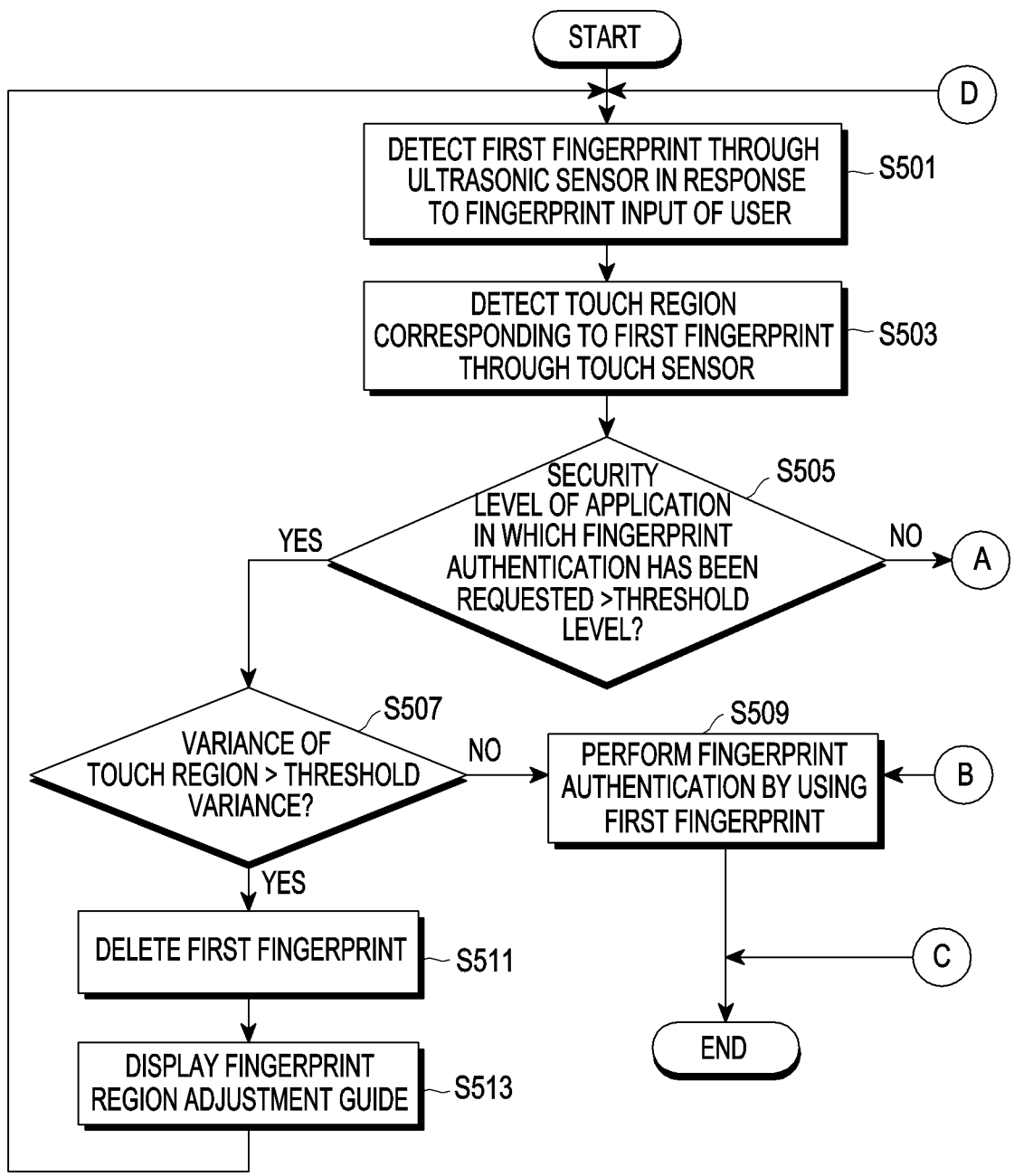
FIGS. 5A and 5B illustrate a fingerprint authentication method of an electronic device according to an embodiment.
Figure 5B:
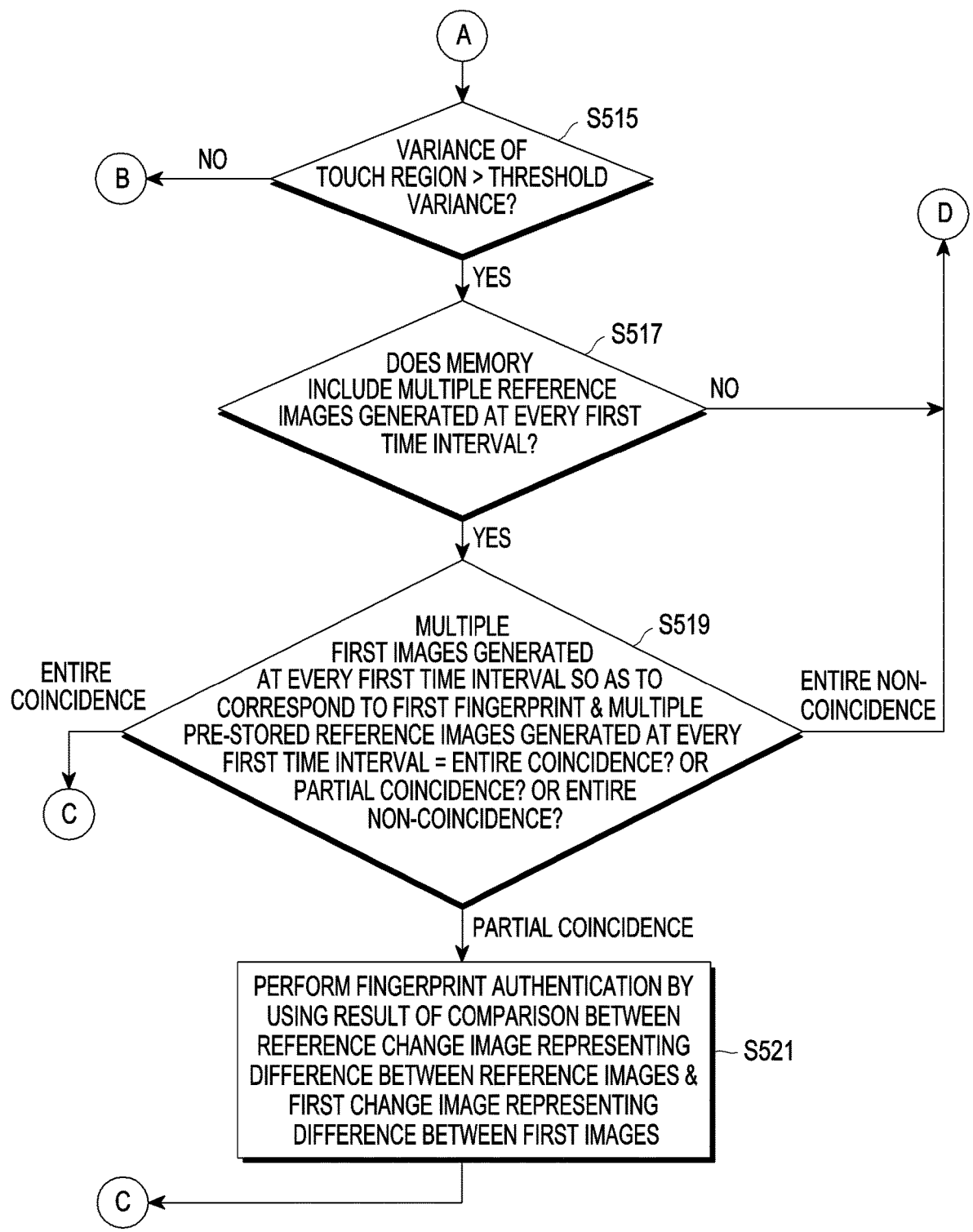

FIGS. 5A and 5B illustrate a fingerprint authentication method of an electronic device according to an embodiment.

As illustrated in FIGS. 5A and 5B, according to an embodiment, in operation S501, a processor (e.g., the processor 120) may detect a first fingerprint through an ultrasonic sensor in response to a fingerprint input of a user.

According to an embodiment, in operation S503, the processor 120 may detect a touch region corresponding to the first fingerprint through a touch sensor.

According to an embodiment, in operation S505, the processor 120 may determine a security level of an application having requested a fingerprint input, and thus may determine whether the application has a security level higher than a threshold level.

For example, a security level of an application may be designated by the user.

Examples of an application having a security level higher than the threshold level may include a financial application and a payment application.

Examples of an application having a security level lower than the threshold level may include a lock release application.

According to an embodiment, when the application is determined to have a security level higher than the threshold level, in operation S507, the processor 120 may determine whether a variance of the touch region is greater than a threshold variance.

For example, the processor 120 may determine whether a variance of the touch region corresponding to the first fingerprint is greater than the predesignated threshold variance, at every predesignated cycle during a time required for detection until the detection of the first fingerprint is completed after operation S501 of starting the detection of the first fingerprint through the ultrasonic sensor.

According to an embodiment, when the variance of the touch region is determined to be less than the threshold variance, in operation S509, the processor 120 may perform fingerprint authentication by using the first fingerprint. For example, the processor 120 may compare the first fingerprint with a pre-stored reference fingerprint, and when a comparison result shows that the first fingerprint coincides with the pre-stored reference fingerprint, may determine that the fingerprint authentication has been completed.

For example, the processor 120 may be in a standby state until the detection of the first fingerprint through the ultrasonic sensor is completed. For example, when the detection of the first fingerprint has been completed, the processor 120 may compare the first fingerprint, the detection of which has been completed, and the reference fingerprint pre-stored in a memory (e.g., the memory 130). For example, the processor 120 may determine a coincidence degree between the first fingerprint and the reference fingerprint on the basis of a comparison result. For example, the processor 120 may perform fingerprint authentication of the first fingerprint on the basis of the determined coincidence degree.

According to an embodiment, when the variance of the touch region is determined to be greater than the threshold variance, in operation S511, the processor 120 may delete the first fingerprint.

According to an embodiment, in operation S513, the processor 120 may display a fingerprint region adjustment guide, which allows the user to adjust the position of the user's finger, on a display (e.g., the display 160).

According to an embodiment, when the application is determined to have a security level lower than the threshold level, in operation S515, the processor 120 may determine whether the variance of the touch region is greater than the threshold variance.

According to an embodiment, when the variance of the touch region is determined to be less than the threshold variance, in operation S509, the processor 120 may perform fingerprint authentication by using the first fingerprint. For example, the processor 120 may compare the first fingerprint with the pre-stored reference fingerprint and when a comparison result shows that the first fingerprint coincides with the pre-stored reference fingerprint the processor 120 may determine that the fingerprint authentication has been completed.

According to an embodiment, when the variance of the touch region is determined to be greater than the threshold variance, in operation S517, the processor 120 may determine whether there exist multiple reference images which are stored in the memory 130 and are generated at every first time interval.

For example, before operation S501, the processor 120 may store one reference fingerprint in the memory 130 through a fingerprint registration procedure described below with reference to FIG. 6.

For example, before operation S501, the processor 120 may generate a reference image at every predesignated cycle (e.g., 200 ms) during a time (e.g., 800 ms), in which detection of one reference fingerprint is started and completed, through the fingerprint registration procedure described below with reference to FIG. 6. For example, the processor 120 may store multiple reference images, generated at every predesignated cycle, in the memory 130.

According to an embodiment, when it is determined that the multiple reference images are not stored in the memory 130 in operation S501, the processor 120 may start detection of the first fingerprint through the ultrasonic sensor.

According to an embodiment, when the multiple reference images are determined to be stored in the memory 130, in operation S519, the processor 120 may determine: whether multiple first images, generated at every first time interval so as to correspond to the first fingerprint, all coincide with the multiple reference images; whether the multiple first images partially coincide with the multiple reference images; or whether the multiple first images do not all coincide with the multiple reference images.

For example, in response to the first fingerprint, the processor 120 may generate multiple first images of the first fingerprint at every predesignated first time interval while detection of the first fingerprint through the ultrasonic sensor is started and then completed.

For example, the processor 120 may compare multiple first images with multiple reference images.

For example, the processor 120 may compare a first image among the multiple first images, which is initially generated after a first time passes from a time point at which detection of the first fingerprint is started, with a reference image among the reference images, which is initially generated after the first time passes from a time point at which detection of the reference fingerprint is started.

For example, when an initially-generated first image does not coincide with an initially-generated reference image, the processor 120 may determine that the multiple first images do not coincide with the multiple reference images.

For example, when the initially-generated first image coincides with the initially-generated reference image, the processor 120 may compare each of at least one first image, which is generated after the first time passes from a time point at which the first image is initially generated, with each of at least one reference image which is generated after the first time passes from a time point at which the reference image is initially generated. For example, when it is determined that each of the at least one first image does not coincide with each of the at least one reference image, the processor 120 may determine that the multiple first images partially coincide with the multiple reference images.

For example, when it is determined that the initially-generated first image coincides with the initially-generated reference image and the one or more remaining first images all coincide with the one or more remaining reference images, the processor 120 may determine that the multiple first images all coincide with the multiple reference images.

According to an embodiment, when it is determined that the multiple first images all coincide with the multiple reference images, the processor 120 may determine that the fingerprint authentication has been completed.

According to an embodiment, when it is determined that the multiple first images do not coincide with the multiple reference images, in operation S501, the processor 120 may restart detection of the first fingerprint through the ultrasonic sensor.

According to an embodiment, when it is determined that the multiple first images partially coincide with the multiple reference images, in operation S521, the processor 120 may perform fingerprint authentication by using a result of comparison between at least one reference change image representing a difference between the multiple reference images and a first change image representing a difference between the multiple first images.

For example, before operation S501, when multiple reference images are generated, the processor 120 may generate at least one reference change image representing a difference between the multiple reference images while generating the multiple reference images. For example, when an initially-generated reference image includes the text "1" and a reference image, which is secondly generated at a time point of elapse of a first time from a time point at which the reference image "1" is generated, includes the text "1" and "2", a first reference change image, which represents a difference between the initially-generated reference image and the secondly-generated reference image, may be "2".

For example, when multiple first images are generated, the processor 120 may generate at least one first change image representing a difference between the multiple first images while generating the multiple first images and a method for generating at least one first change image may be identical to a method for generating at least one reference change image.

For example, as a result of comparison between at least one reference change image and at least one first change image, when it is determined that the at least one reference change image completely coincides with the at least one first change image, the processor 120 may determine that the authentication of the first fingerprint has been completed.

Figure 6:
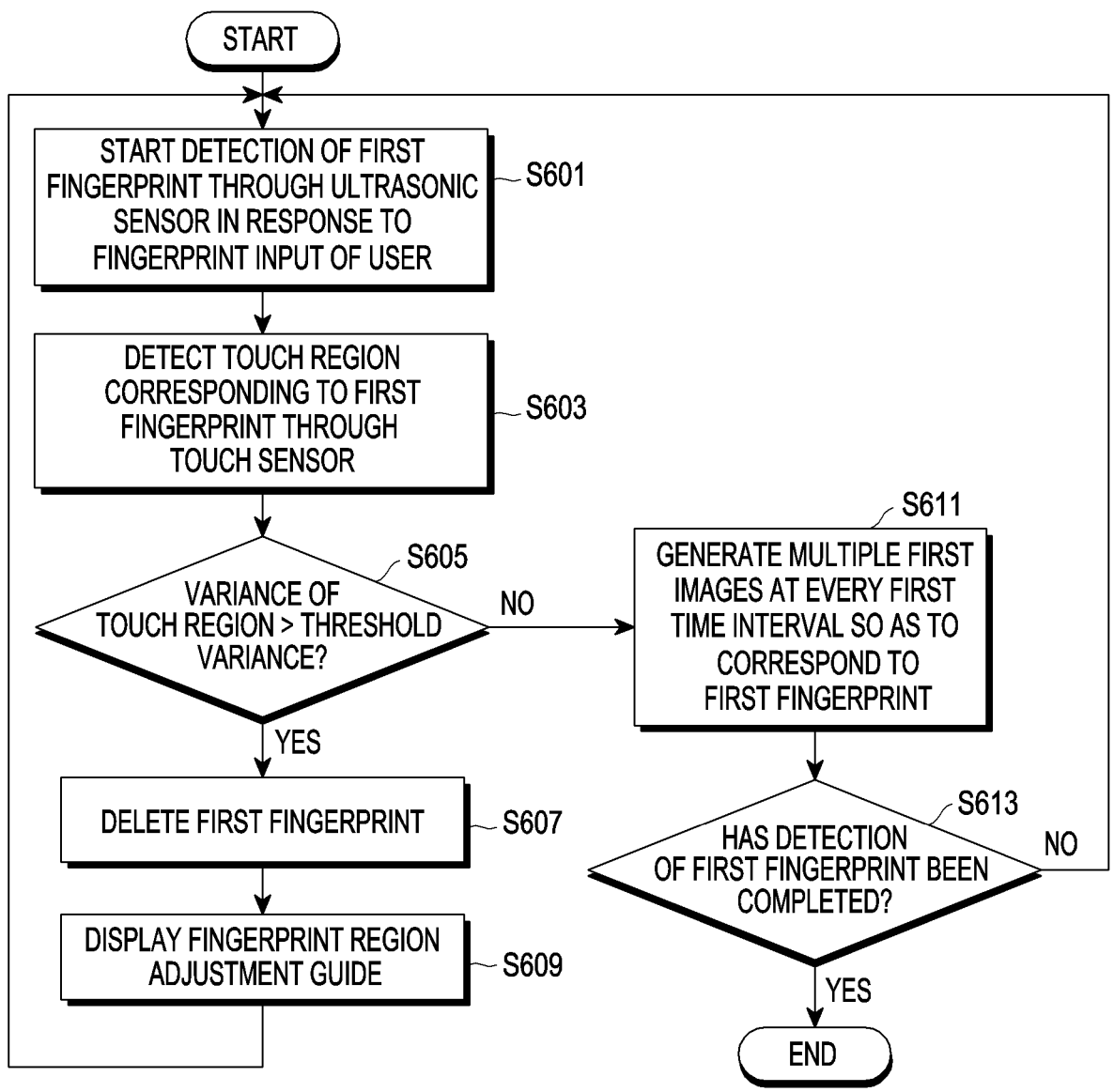
FIG. 6 illustrates a fingerprint registration method of an electronic device according to an embodiment.

FIG. 6 illustrates a fingerprint registration method of an electronic device according to an embodiment.

As illustrated in FIG. 6, according to an embodiment, before operation S510 of FIG. 5, in operation S601, a processor (e.g., the processor 120) may start detection of a first fingerprint through an ultrasonic sensor in response to a fingerprint input of a user.

According to an embodiment, in operation S603, the processor 120 may detect a touch region corresponding to the first fingerprint through a touch sensor.

According to an embodiment, in operation S605, the processor 120 may determine whether a variance of the touch region is greater than a threshold variance.

According to an embodiment, when the variance of the touch region is determined to be greater than the threshold variance, in operation S607, the processor 120 may delete images of the first fingerprint detected until a time point at which the variance of the touch region is determined to be greater than the threshold variance.

According to an embodiment, in operation S609, the processor 120 may display a fingerprint region adjustment guide, which allows the user to adjust the position of the user's finger, on a display (e.g., the display 160).

According to an embodiment, when the variance of the touch region is determined to be less than the threshold variance, in operation S611, the processor 120 may generate multiple first images at every first time interval so as to correspond to the first fingerprint.

For example, the processor 120 may configure the multiple first images, generated at every first time interval so as to correspond to the first fingerprint, as multiple reference images and may store the same in a memory (e.g., the memory 130).

According to an embodiment, in operation S613, the processor 120 may determine whether the detection of the first fingerprint through the ultrasonic sensor has been completed.

According to an embodiment, when the detection of the first fingerprint has been completed, the processor 120 may configure the first fingerprint as a reference fingerprint and may store the same in the memory 130.

Figure 7A:
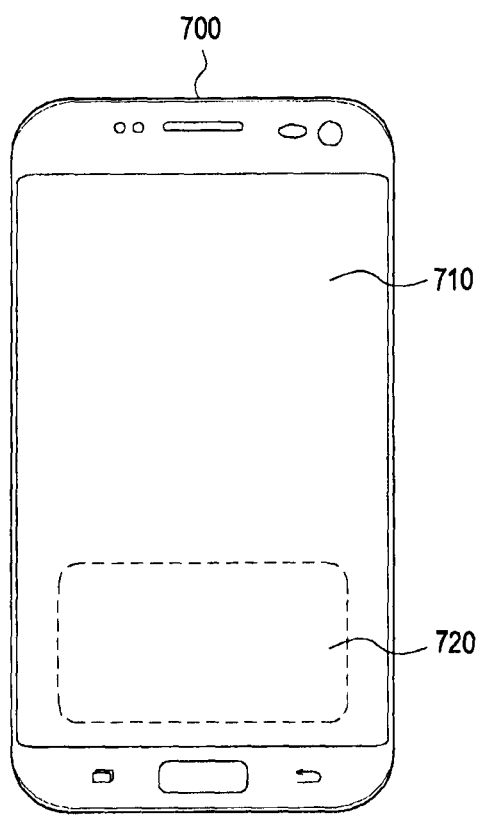
FIGS. 7A and 7B illustrate front surfaces of different electronic devices according to an embodiment.
Figure 7B:
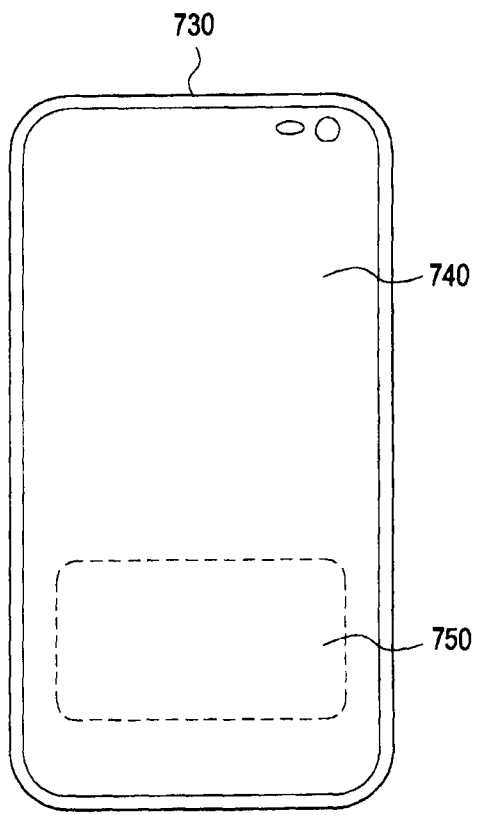

FIGS. 7A and 7B illustrate front surfaces of different electronic devices according to an embodiment.

For example, each of the different electronic devices illustrated in FIGS. 7A and 7B may be the electronic device (e.g., the electronic 101) of FIG. 1 or the electronic device (e.g., the electronic device 201) of FIG. 2, and may include the program module of FIG. 3.

As illustrated in FIG. 7A, according to an embodiment, the electronic device 700 may have a biometric sensor 720 (e.g., a fingerprint sensor) configured to recognize biometric information (e.g., fingerprint information) in at least a partial region of a display 710.

According to an embodiment, the biometric sensor 720 may be configured in at least a part (e.g., an active area or black matrix (BM) area of a display) of the display 710, and thus may acquire a user's biometric information by using a user input on the display 710.

As illustrated in FIG. 7B, according to an embodiment, the electronic device 730 may include a biometric sensor 750 configured in at least a part of a display 740, and thus may configure a region, occupied by the biometric sensor 750, as the display 740 so as to extend the size of the display.

According to an embodiment, the electronic device 730 may include multiple fingerprint sensors. For example, the electronic device 730 may include different sensing types of fingerprint sensors (e.g., two or more combinations among optical type, capacitive type, ultrasonic type, and multispectral type). For example, fingerprint sensors may have different fingerprint sensing regions according to sensing types.

Figure 8:
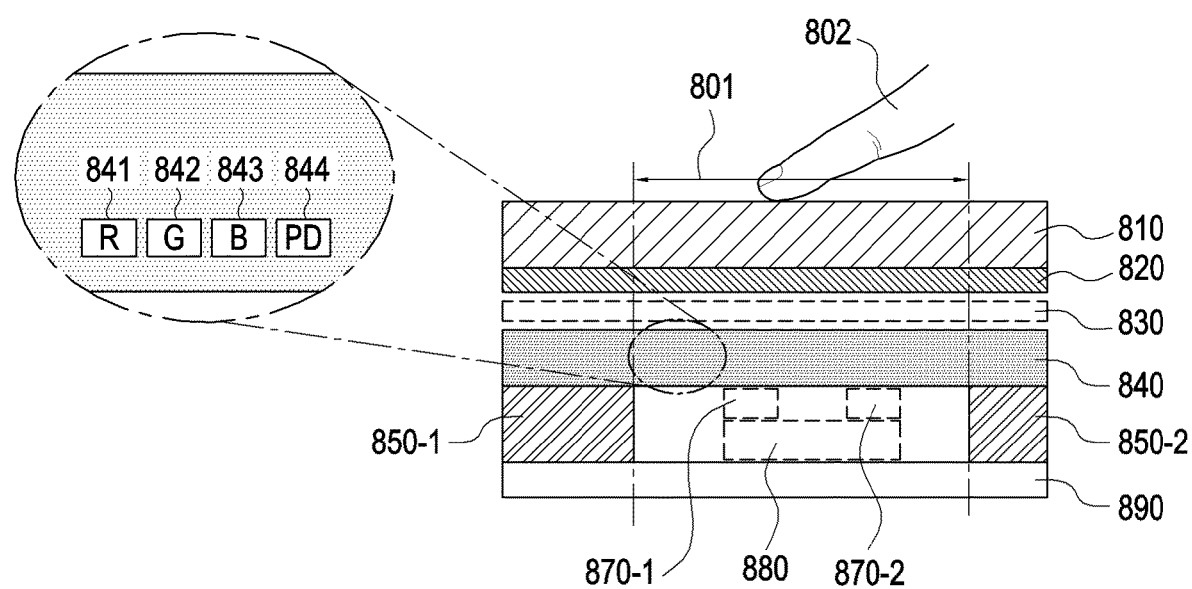
FIG. 8 illustrates a lateral surface of an electronic device according to an embodiment.

FIG. 8 illustrates a lateral surface of an electronic device according to an embodiment.

As illustrated in FIG. 8, according to an embodiment, the electronic device (e.g., the electronic device 700 or 730) may include a biometric sensor (e.g., the biometric sensor 720, or 750 in FIG. 7) configured to detect biometric information of a user 802 in at least a partial region 801 of a display 840.

According to an embodiment, the electronic device (e.g., the electronic device 700 or 730) may include glass 810, a fingerprint sensor 830, the display 840, a fingerprint sensor 880, or a PCB 890.

According to an embodiment, the glass 810 may be coupled to the fingerprint sensor 830 or the display 840 through an adhesive 820. According to an embodiment, the electronic device 700 or 730 may further include structures 850-1 and 850-2 configured to ensure a space in which the biometric sensor 880 is mounted. For example, the structures 850-1 and 850-2 may constitute at least part of a sealing structure configured to protect the fingerprint sensor 880.

According to an embodiment, the biometric sensors 830 and 880 may be configured in a partial region (e.g., one region or multiple regions) of the display 840 or an entire region of the display 840 (e.g., an active area of the display).

According to an embodiment, the biometric sensors 830 and 844 capable of detecting biometric information may be configured on one surface (e.g., a top surface) (e.g., a separate layer 830 on one surface of the display, or at least a partial region of a surface on which pixels 841 to 843 of the display are configured) of the display.

According to an embodiment, the biometric sensor 880 may be configured on another surface (e.g., rear surface) of the display. For example, the biometric sensors 830, 844, and 880 may include an optical image sensor, an ultrasonic transmission/reception module, or an electrostatic transmission/reception electrode pattern.

According to an embodiment, the biometric sensor 830 may be configured between a bonding layer 820 and the display 840 or between the window glass 810 and the bonding layer 820. For example, the biometric sensor 830 may be formed of an electrostatic transmission/reception electrode pattern, and may be formed of a transparent electrode in order to increase the transmittance of light radiated from the display 840. For example, the biometric sensor 830 may also include an ultrasonic transmission/reception module.

According to an embodiment, the electronic device 700 or 730 may have the biometric sensor 880 configured on another surface of the display. For example, an elastic body 870-1 and 870-2 (e.g., a sponge, a rubber material, etc.) configured to absorb shock between the biometric sensor 880 and the display 840 or prevent a foreign object from entering may be configured between the biometric sensor 880 and the display 840. For example, the biometric sensor 880 may include an image sensor. For example, the image sensor may radiate light (e.g., visible light, infrared light, or ultraviolet light) emitted from a light source (e.g., the display 840 or an IR LED) to a user's fingerprint, and may detect the light reflected from the user's fingerprint through the image sensor.

An electronic device according to various embodiments of the disclosure may include: a first sensor configured to detect a first fingerprint; a second sensor configured to detect a touch region corresponding to the first fingerprint; and a processor configured to perform fingerprint authentication by using multiple first images acquired to correspond to the first fingerprint, according to the touch region.

According to various embodiments, the second sensor may include a touch screen module.

Figure 9:
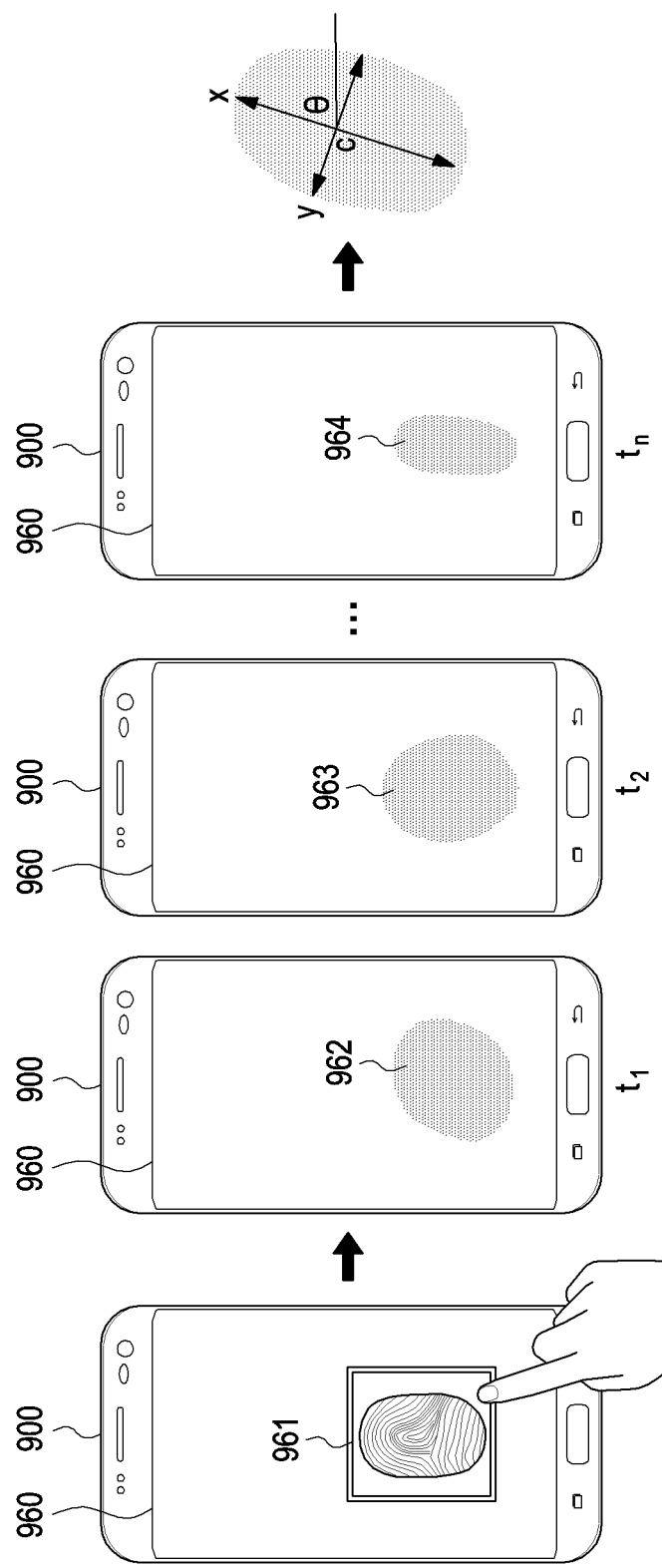
FIG. 9 illustrates an operation of detecting a variance of a touch region when a fingerprint is registered in an electronic device according to an embodiment.

FIG. 9 illustrates an operation of detecting a variance of a touch region when a fingerprint is registered in an electronic device according to an embodiment.

For example, the electronic device 900 of FIG. 9 may be the electronic device (e.g., the electronic device 101) of FIG. 1, the electronic device (e.g., the electronic device 201) of FIG. 2, or the electronic device (e.g., the electronic device 700) of FIG. 7, and may include the program module of FIG. 3.

As illustrated in FIG. 9, according to an embodiment, when a fingerprint authentication request is received from a user as in operation S601 of FIG. 6, after starting detection of a first fingerprint through an ultrasonic sensor (e.g., the ultrasonic biometric sensor 880 of FIG. 8), a processor (e.g., the processor 120) of the electronic device 900 may display a fingerprint detection guide 961 configured to guide fingerprint detection on a display 960 including a touch sensor (e.g., the optical biometric sensor 830 of FIG. 8).

For example, when the user's finger is detected on the display 960, the processor 120 may display touch regions 962, 963, and 964, in which the user's finger is detected, on the display 960. For example, the processor 120 may not display a touch region.

For example, when the user's finger is first detected at a first time $t_1$ and thus a first touch region 962 is first detected by the display 960, the processor 120 may detect a second touch region 963 in which the user's finger is secondly detected at a time point of a predesignated second time $t_2$ from a time point at which the first touch region 962 is detected.

For example, when the user's finger is secondly detected at the second time $t_2$ and thus the second touch region 963 is first detected by the display 963, the processor 120 may detect an n-th touch region 964 in which the user's finger is detected in an n-th order at a time point of a predesignated n-th time $t_n$ from a time point at which the second touch region 963 is detected.

For example, the processor 120 may detect a touch region variance including an x-axis variance x, a y-axis variance y, an origin variance c, and/or an angle variance θ of the second touch region 963 at the second time $t_2$ and/or the n-th touch region 964 at the n-th time $t_n$.

Figure 10:
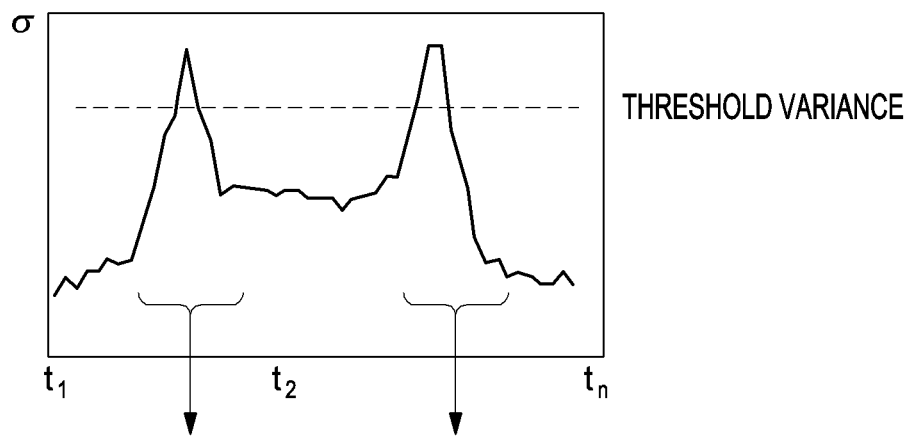
FIG. 10 illustrates an example of a guide display operation according to detection of a variance of a touch region when a fingerprint is registered in an electronic device according to an embodiment.
Figure 10:
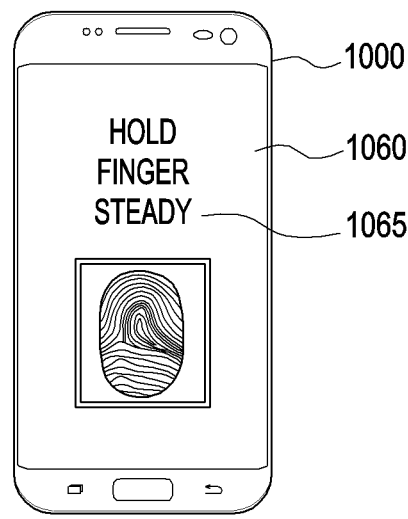

FIG. 10 illustrates an example of a guide display operation according to detection of a variance of a touch region when a fingerprint is registered in an electronic device according to an embodiment.

For example, the electronic device 1000 of FIG. 10 may be the electronic device (e.g., the electronic device 101) of FIG. 1, the electronic device (e.g., the electronic device 201) of FIG. 2, the electronic device (e.g., the electronic device 700) of FIG. 7, or the electronic device (the electronic device 900) of FIG. 9, and may include the program module of FIG. 3.

As illustrated in FIG. 10, according to an embodiment, when a variance of a touch region is detected as in operation S605 of FIG. 6, a touch region variance σ may include an x-axis variance x, a y-axis variance y, an origin variance c, and/or an angle variance θ, and the touch region variance σ may be determined on the basis of an x-axis variance x, a y-axis variance y, an origin variance c, and/or an angle variance θ. For example, the touch region variance σ may be determined as the sum of values obtained by multiplying an x-axis variance x, a y-axis variance y, an origin variance c, and an angle variance θ by parameters $a_1$, $a_2$, $a_3$, and $a_4$, respectively, and may be expressed by Equation 1 below.

$$\sigma = a_1 * x + a_2 * y + a_3 * c + a_4 * \theta \qquad \text{<Equation 1>}$$

For example, $a_1$ and $a_2$ may be values less than $a_3$ and $a_4$. For example, the parameter a1 for x and the parameter a2 for y may be values less than the parameters $a_3$ and $a_4$ for c and θ which may have relatively large effects on the touch region variance σ, respectively.

For example, the touch region variance σ may be considered with reference to a touch region at the first time $t_1$.

For example, a touch region variance at a first time $t_i$ may be expressed by $\sigma_1 = a_1*x_1 + *y_1 + a_3*c_1 + a_4*0 + a_1*0 + a_2*0 + a_3*0 + *a_4*0 = 0$.

For example, a touch region variance at a second time $t_2$ may be expressed by $\sigma_2 = a_1*x_2 + a_2*y_2 + a_3*c_2 + a_4*\theta_2$.

For example, a touch region variance at an n-th time $t_n$, may be expressed by $\sigma_n = a_1*x_n + a_2*y_n + a_3*c_n + a_4*\theta_n$.

For example, a processor (e.g., the processor 120) of the electronic device 1000 may detect a touch region variance between the first time $t_1$ (e.g., 0 second), at which detection of a first fingerprint is started and detection of a touch region corresponding to the first fingerprint is started, and the n-th time $t_n$, (e.g., 800 ms) at which the detection of the first fingerprint is completed. For example, at every predesignated time interval (e.g., 1 ms), the processor 120 may determine whether a touch region variance at a particular time point between the first time $t_1$ and the n-th time $t_n$, is greater than a predesignated threshold variance.

For example, when it is determined that a touch region variance during a particular time period is greater than the threshold variance, the processor 120 may display, on a display 1060, a fingerprint region adjustment guide reading "Hold Finger Steady!" 1065.

Figure 11:
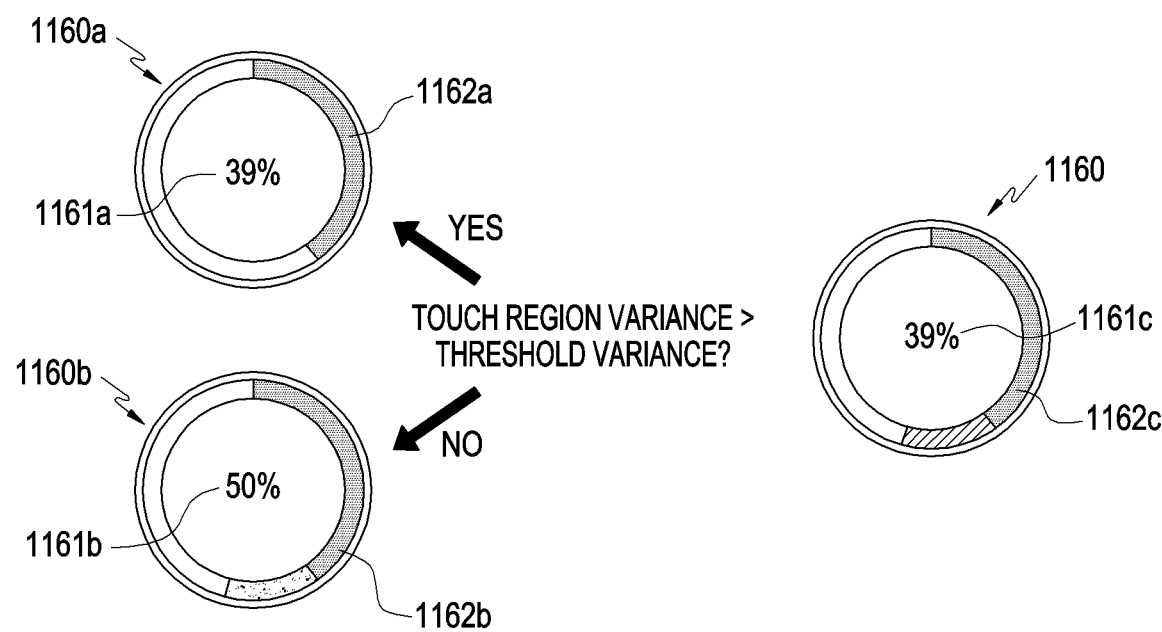
FIG. 11 illustrates another example of a guide display operation according to detection of a variance of a touch region when a fingerprint is registered in an electronic device according to an embodiment.

FIG. 11 illustrates another example of a guide display operation according to detection of a variance of a touch region when a fingerprint is registered in an electronic device according to an embodiment.

As illustrated in FIG. 11, according to an embodiment, during the fingerprint registration procedure described above with reference to FIG. 6, a processor (e.g., the processor 120) may display, on a display 1160, a progress ratio of detection of a fingerprint from a time point, at which the detection of the fingerprint through an ultrasonic sensor is started, to a current time point. For example, the processor 120 may display, on the display 1160, percent information (e.g., 39%) 1161c and graph information 1162c corresponding to a progress ratio of the detection of the fingerprint to the current time point.

According to an embodiment, when a variance of a touch region corresponding to a first fingerprint is greater than a threshold variance during the fingerprint registration procedure, the processor 120 may stop the detection of the first fingerprint and may display, on the display 1160a, percent information (e.g., 39%) 1161b and/or graph information 1162b corresponding to a progress ratio to the current time point.

According to an embodiment, when the variance of the touch region corresponding to the first fingerprint is less than the threshold variance during the fingerprint registration procedure, while continuously detecting the first fingerprint, the processor 120 may display, on the display 1160b, percent information (e.g., 50%) 1161b and/or graph information 1162b corresponding to a progress ratio to the current time point.

Figure 12:
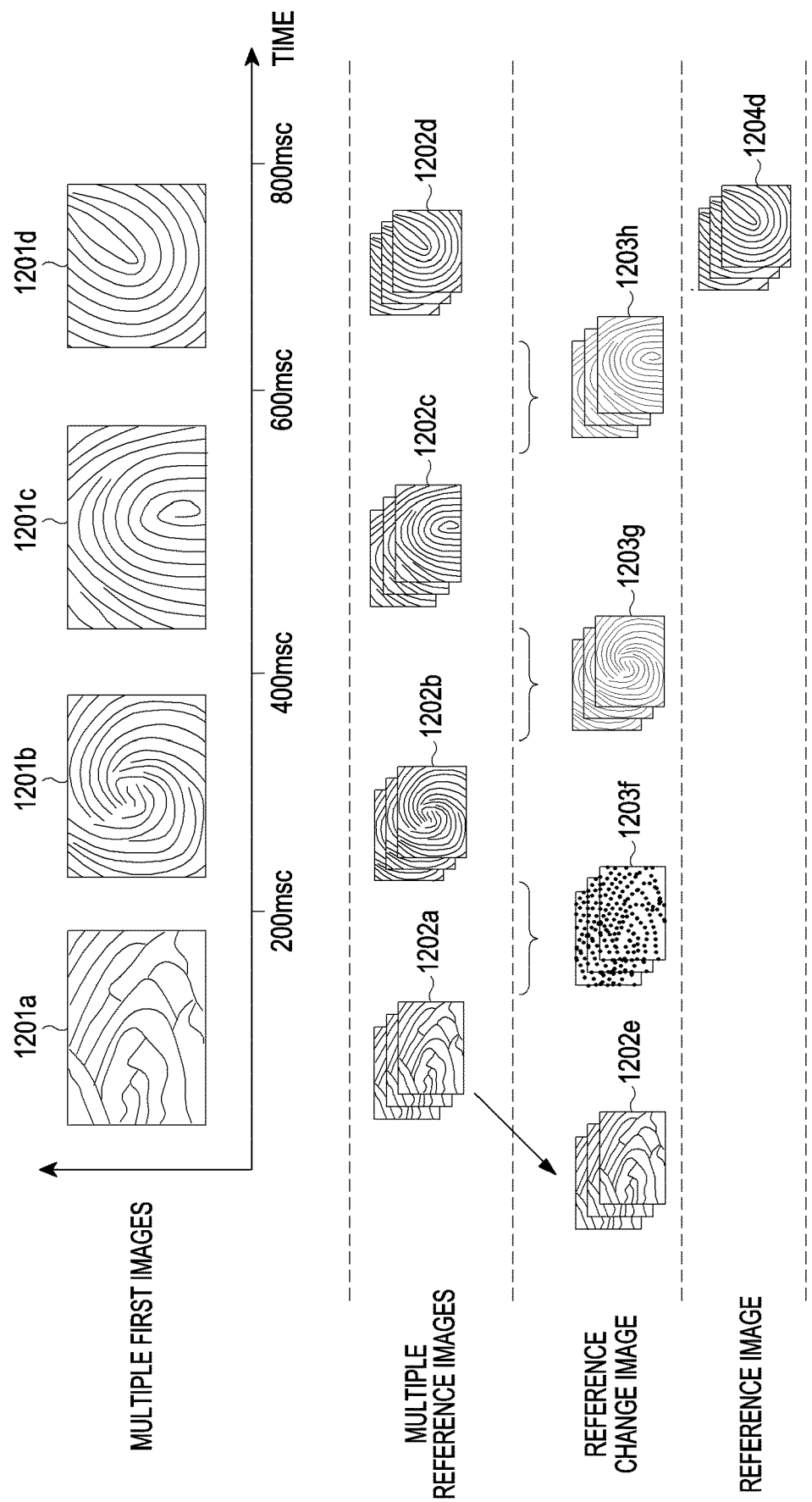
FIG. 12 illustrates a reference image of an electronic device according to an embodiment.

FIG. 12 illustrates a reference image of an electronic device according to an embodiment.

As illustrated in FIG. 12, according to an embodiment, during the fingerprint authentication procedure described above with reference to FIGS. 4 and 5, a processor (e.g., the processor 120) may acquire multiple first images 1201a, 1201b, 1201c, and 1201d at every first time interval (e.g., 200 ms) so as to correspond to a first fingerprint 1201d while currently detecting the first fingerprint 1201d through an ultrasonic sensor.

According to an embodiment, during the fingerprint registration procedure described above with reference to FIG. 6, while detecting a reference fingerprint 1202d and 1204d through an ultrasonic sensor, the processor 120 may generate multiple reference images 1202a, 1202e, 1202b, 1202c, and 1202d at every first time interval (200 ms) so as to correspond to the reference fingerprint 1202d and 1204d, and may store the same in a memory (e.g., the memory 130).

According to an embodiment, while generating the multiple reference images 1202a, 1202e, 1202b, 1202c, and 1202d at every first time interval (200 ms), the processor 120 may acquire: a reference change image 1203f representing a difference between the first reference image 1202a and 1202e and the second reference image 1202b; a reference change image 1203g representing a difference between the second reference image 1202b and the third reference image 1202c; and a reference change image 1203h representing a difference between the third reference image 1202c and the reference fingerprint 1202d and 1204d.

According to an embodiment, when after the processor 120 starts detection of the first fingerprint through the ultrasonic sensor, an application in which fingerprint authentication has been requested is determined to have a security level lower than a threshold level and a variance of a touch region corresponding to the first fingerprint is determined to be less than a threshold variance, the processor 120 may compare the multiple reference images 1202a, 1202e, 1202b, 1202c, and 1202d stored in the memory 130 with the multiple currently-detected first images 1201a, 1201b, 1201c, and 1201d.

For example, when the first reference image 1202a and 1202e among the multiple reference images does not coincide with the first image 1201a which has been first acquired, the processor 120 may determine that the multiple reference images do not all coincide with the multiple first images, so as to determine that the position of the user's finger is currently incorrect, thereby restarting detection of the first fingerprint through the ultrasonic sensor from the beginning.

For example, when the first reference image 1202a and 1202e among the multiple reference images coincides with the first image 1201a which has been first acquired, the processor 120 may compare the second reference image 1202b with the first image 1201b which has been secondly acquired.

For example, when the second reference image 1202b does not coincide with the first image 1201b which has been secondly acquired, the processor 120 may compare the third reference image 1202c with the first image 1201c which has been thirdly acquired.

For example, when the third reference image 1202c coincides with the first image 1201c which has been thirdly acquired, the processor 120 may compare the reference fingerprints 1202d and 1204d which are the fourth reference images and are reference fingerprints with the first fingerprint 1201d which is the first fingerprint and is the first image that has been fourthly acquired.

When the reference fingerprints 1202d and 1204d which are the fourth reference images and is a reference fingerprint coincides with the first fingerprint 1201d which is the first fingerprint and is the first image that has been fourthly acquired, the processor 120 may determine that the multiple reference images all coincide with the multiple first images, and thus may determine that the authentication of the first fingerprint has been completed.

When it is determined that the reference fingerprints 1202d and 1204d which are the fourth reference images and is a reference fingerprint does not coincide with the first fingerprint 1201d which is the first fingerprint and is the first image that has been fourthly acquired, the processor 120 does not determine that the authentication of the first fingerprint has failed, and may compare the reference change image 1203h representing a difference between the third reference image 1202c and the fourth reference images 1202b and 1204d with a difference (a first change image) between the first image 1201c, which has been thirdly acquired, and the first image 1201d which has been fourthly acquired.

For example, when the reference change image 1203h representing the difference between the third reference image 1202c and the fourth reference images 1202b and 1204d coincide with the difference (the first change image) between the first image 1201c, which has been thirdly acquired, and the first image 1201d which has been fourthly acquired, the processor 120 may determine that the authentication of the first fingerprint has been completed.

Figures 13A, 13B:
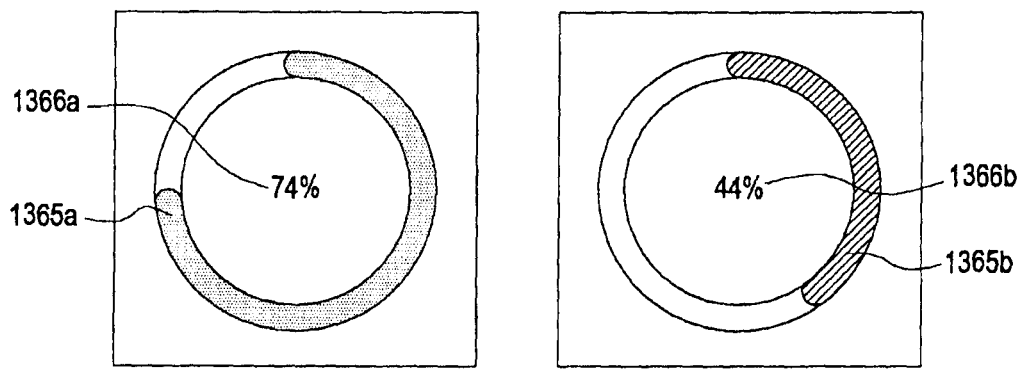
FIGS. 13A and 13B illustrate an example of a guide display operation according to detection of a variance of a touch region when a fingerprint is authenticated by an electronic device according to an embodiment.

FIGS. 13A and 13B illustrate an example of a guide display operation according to detection of a variance of a touch region when a fingerprint is authenticated by an electronic device according to an embodiment.

As illustrated in FIG. 13A, according to an embodiment, after the detection of the first fingerprint is started in operation S501 of FIG. 5 and the touch region is detected in operation S503, when after it is determined in operation S505 of FIG. 5 that the application in which the fingerprint authentication has been requested has a security level higher than the threshold level, it is determined in operation S507 that the variance of the touch region is less than the threshold variance, a processor (e.g., the processor 120) may display, on a display (e.g., the display 160), a progress ratio of the detection of the first fingerprint in the form of percent information (e.g., 74%) 1366a and graph information 1365a. For example, when the variance of the touch region is determined to be less than the threshold variance, the processor 120 may display the graph information 1365a in a green color.

Similarly, as illustrated in FIG. 13B, the processor 120 may display, on the display 160, a progress ratio of the detection of the first fingerprint in the form of percent information (e.g., 44%) 1366b and graph information 1365b. For example, when the variance of the touch region is determined to be greater than the threshold variance, the processor 120 may display the graph information 1365b in a red color.

Figure 14:
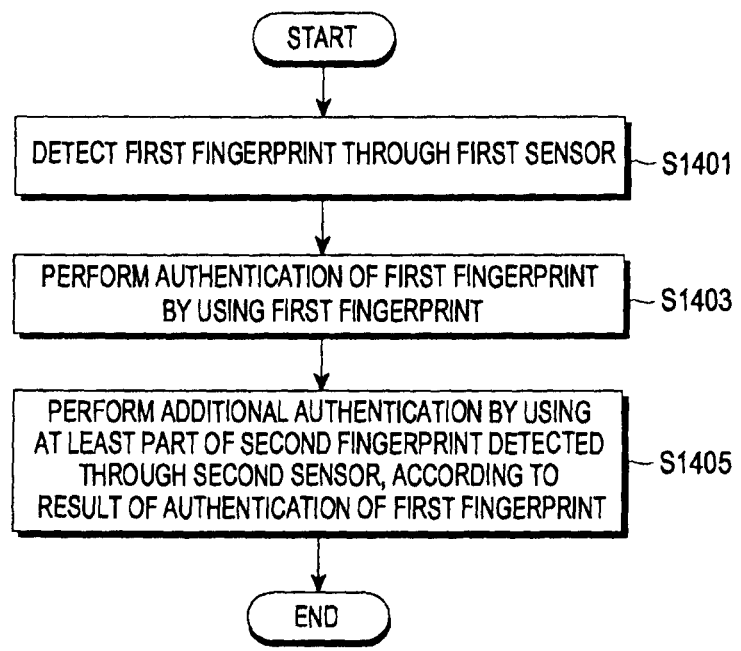
FIG. 14 illustrates a control method of an electronic device according to another embodiment.

FIG. 14 illustrates a control method of an electronic device according to another embodiment.

As illustrated in FIG. 14, according to another embodiment, in operation S1401, a processor (e.g., the processor 120) may detect a first fingerprint through a first sensor.

For example, the first sensor may be the optical sensor 830 described above with reference to FIG. 8.

According to another embodiment, in operation S1403, the processor 120 may perform authentication of the first fingerprint by using the first fingerprint detected through the first sensor which is an optical sensor.

According to another embodiment, in operation S1405, the processor 120 may perform additional authentication by using the first fingerprint and at least a part of a second fingerprint, detected through a second sensor, according to a result of the authentication of the first fingerprint.

For example, the second sensor may be the ultrasonic sensor 880 described above with reference to FIG. 8.

For example, the processor 120 may detect the second fingerprint or at least a part of the second fingerprint through the second sensor which is an ultrasonic sensor, or may perform additional authentication by using the first fingerprint and the second fingerprint or the at least a part of the second fingerprint, according to the result of the authentication of the first fingerprint performed using the first fingerprint detected through the first sensor which is an optical sensor.

For example, when the authentication of the first fingerprint is determined to have failed, the processor 120 may perform additional authentication by using, together with the first fingerprint, the second sensor or the at least a part of the second fingerprint detected through the second sensor which is an ultrasonic sensor.

A control method of an electronic device according to various embodiments of the disclosure may include: detecting a first fingerprint through a first sensor; performing authentication of the first fingerprint by using the first fingerprint; and performing additional authentication by using at least a part of a second fingerprint detected through the second sensor, according to a result of the authentication of the first fingerprint.

According to various embodiments, the control method may include, before performing the authentication of the first fingerprint on the basis of a state-of-charge of a battery, starting detection of the second fingerprint by activating the second sensor.

According to various embodiments, the control method may include, when the state-of-charge of the battery is greater than a threshold voltage value, before performing the authentication of the first fingerprint, starting detection of the second fingerprint by activating the second sensor.

According to various embodiments, the control method may include performing the additional authentication according to the result of the authentication of the first fingerprint.

According to various embodiments, the control method may include performing the additional authentication according to a similarity between the first fingerprint and a pre-stored reference fingerprint.

According to various embodiments, the control method may include performing the additional authentication when the similarity is greater than or equal to a first similarity value.

According to various embodiments, the control method may include performing the additional authentication according to a security level of an application in which authentication of the first fingerprint has been requested.

According to various embodiments, the control method may include, when the application has a security level lower than a threshold level, performing first additional authentication by using the first fingerprint and the at least a part of the second fingerprint, according to the result of the authentication of the first fingerprint.

According to various embodiments, the control method may include performing the first additional authentication when the similarity is less than or equal to a second similarity value.

According to various embodiments, the control method may include performing second additional authentication by using the second fingerprint and the first fingerprint, according to a result of the first additional authentication.

According to various embodiments, the control method may include performing the first additional authentication when a similarity between the reference fingerprint and a third fingerprint, obtained by synthesizing the first fingerprint and the at least a part of the second fingerprint, is less than or equal to a third similarity value.

According to various embodiments, the control method may include performing the first additional authentication when a value of a third similarity, which reflects a first similarity between the first fingerprint and the reference fingerprint and a second similarity between the at least a part of the second fingerprint and the reference fingerprint, is less than or equal to the third similarity value.

According to various embodiments, the control method may include performing second additional authentication by using the second fingerprint and the first fingerprint when the application has a security level higher than the threshold level.

Figure 15:
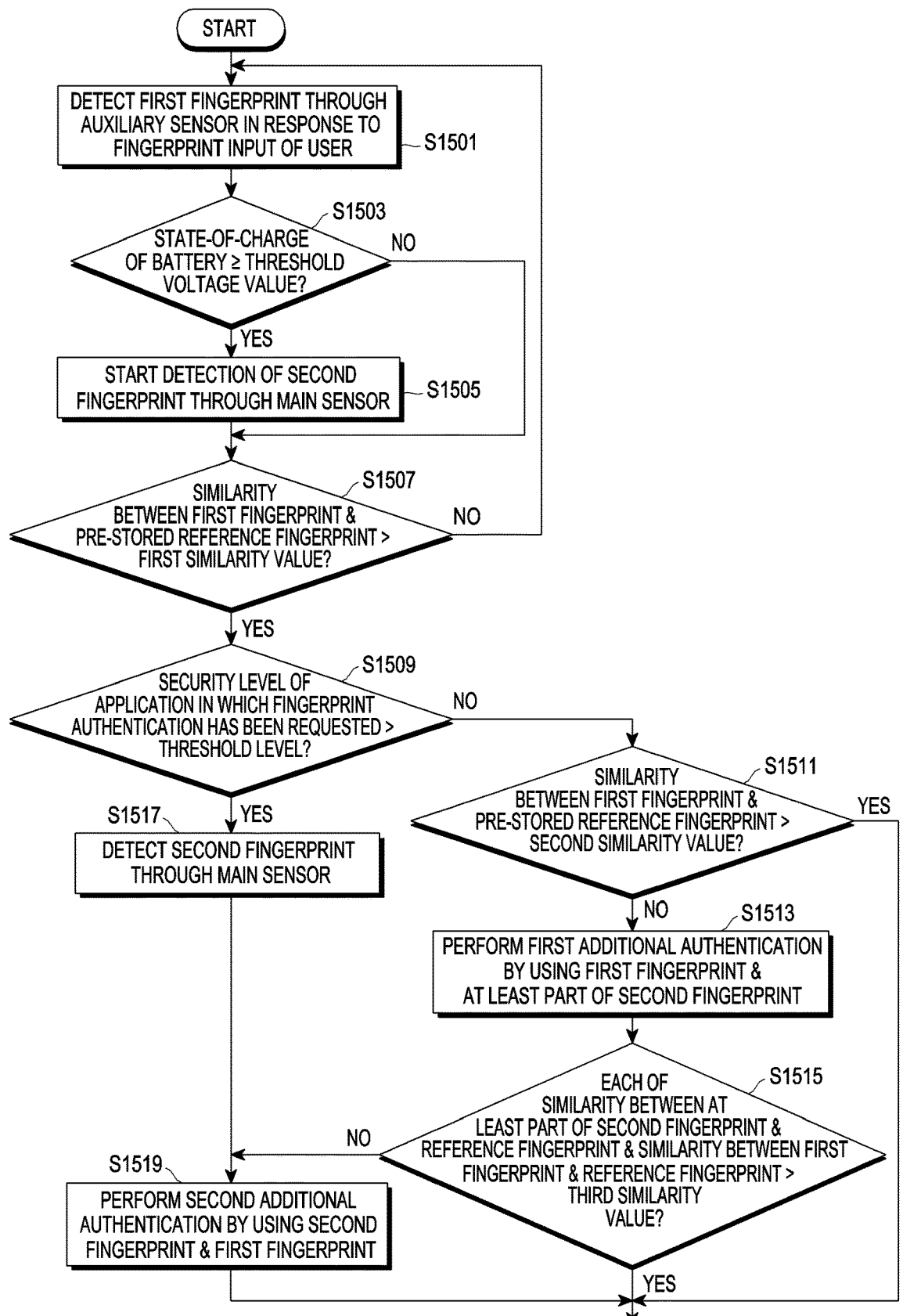
FIG. 15 illustrates a fingerprint authentication method of an electronic device according to another embodiment.

FIG. 15 illustrates a fingerprint authentication method of an electronic device according to another embodiment.

As illustrated in FIG. 15, according to another embodiment, in operation S1501, a processor (e.g., the processor 120) may detect a first fingerprint through an auxiliary sensor in response to a fingerprint input of a user.

For example, the auxiliary sensor may be an optical sensor described above with reference to FIG. 14. For example, a main sensor different from the auxiliary sensor may be an ultrasonic sensor described above with reference to FIG. 14.

According to another embodiment, in operation S1503, the processor 120 may determine whether a state-of-charge of a battery of the electronic device (e.g., the electronic device 101) is greater than or equal to a threshold voltage value.

For example, the processor 120 may determine a state-of-charge of the battery 296 of the electronic device (e.g., the electronic device 201), and may determine whether a state-of-charge of the battery 296 is greater than or equal to a threshold voltage value.

According to another embodiment, when the state-of-charge of the battery 296 is determined to be greater than or equal to the threshold voltage value, in operation S1505, the processor 120 may initiate (start) detection of a second fingerprint through the main sensor (an ultrasonic sensor).

According to another embodiment, when the state-of-charge of the battery 296 is less than the threshold voltage value or after operation S1505, in operation S1507, the processor 120 may determine whether a similarity between the first fingerprint and a pre-stored reference fingerprint is greater than a first similarity value.

For example, a "determination of a similarity between the first fingerprint and a pre-stored reference fingerprint" in operation S1507 may be identical to the "result of the authentication of the first fingerprint" in operation S1405 of FIG. 14.

According to another embodiment, when the similarity between the first fingerprint and the pre-stored reference fingerprint is less than or equal to the first similarity value, in operation S1505, the processor 120 may detect the first fingerprint through the auxiliary sensor.

According to another embodiment, when the similarity between the first fingerprint and the pre-stored reference fingerprint is greater than the first similarity value, in operation S1509, the processor 120 may determine whether an application having requested a fingerprint input has a security level higher than a threshold level.

According to another embodiment, when the application having requested the fingerprint input has a security level lower than or equal to the threshold level, in operation S1511, the processor 120 may determine whether the similarity between the first fingerprint and the pre-stored reference fingerprint is greater than a second similarity value.

For example, the processor 120 may determine whether the similarity between the first fingerprint and the pre-stored reference fingerprint is greater than the first similarity value and is also greater than the second similarity value. For example, the second similarity value may be set to be greater than the first similarity value.

According to another embodiment, when it is determined that the similarity between the first fingerprint and the pre-stored reference fingerprint is greater than the first similarity value and is also greater than the second similarity value, the processor 120 may determine that an authentication result of the first fingerprint is successful in the application having a security level lower than or equal to the threshold level, and thus may terminate the authentication procedure for the first fingerprint.

According to another embodiment, when it is determined that the similarity between the first fingerprint and the pre-stored reference fingerprint is greater than the first similarity value and is less than or equal to the second similarity value, in operation S1513, the processor 120 may activate the main sensor and may start detection of the second fingerprint through the main sensor, and simultaneously, may perform first additional authentication by using the first fingerprint and at least a part of the second fingerprint, the detection of which has been completed to a current time point.

As an example, the processor 120 may synthesize the first fingerprint and at least a part of the second fingerprint. For example, the processor 120 may configure an entire region of the first fingerprint as a first region and may configure an entire region of the at least a part of the second fingerprint as a second region, and thus may generate an additional synthesis fingerprint configured such that the first fingerprint corresponds to the first region and the at least a part of the second fingerprint corresponds to the second region. For example, the processor 120 may cause the entire region of the first fingerprint and the entire region of the at least a part of the second fingerprint to overlap each other in the same area, and thus may generate an overlapping synthesis fingerprint having an entire area in which the first fingerprint overlaps the at least a part of the second fingerprint. For example, the processor 120 may perform first additional authentication by using a value of a similarity between the synthesis fingerprint and the reference fingerprint.

As another example, the processor 120 may make a first comparison between the first fingerprint and the reference fingerprint, may make a second comparison between at least a part of the second fingerprint and the reference fingerprint, and thus may perform first additional authentication by using a result of the first comparison and a result of the second comparison. For example, the processor 120 may perform first additional authentication by using an average similarity value obtained by averaging a value of one similarity between the first fingerprint and the reference fingerprint and a value of another similarity between the at least a part of the second fingerprint and the reference fingerprint.

According to another embodiment, in operation S515, as a result of the first additional authentication performed using the first fingerprint and at least a part of the second fingerprint, the processor 120 may determine whether the similarity between the at least a part of the second fingerprint and the reference fingerprint is greater than a third similarity value and whether the similarity between the first fingerprint and the reference fingerprint is greater than the third similarity value.

For example, the processor 120 may determine whether one similarity value or an average similarity value performed using the synthesis fingerprint is greater than the third similarity value.

According to another embodiment, when it is determined that the one similarity value or the average similarity value performed using the synthesis fingerprint is greater than the third similarity value, the processor 120 may determine that the first additional authentication is successful, and thus may terminate the authentication operation.

According to another embodiment, when the one similarity value or the average similarity value performed using the synthesis fingerprint is less than or equal to the third similarity value, in operation S1519, if the detection of the second fingerprint is completed, the processor 120 may perform second additional authentication by using the second fingerprint and the first fingerprint.

According to another embodiment, when the application having requested a fingerprint input is determined to have a security level higher than the threshold level, in operation S1517, the processor 120 may activate the main sensor, may start detection of the second fingerprint through the main sensor, and may complete the detection of the second fingerprint through the main sensor.

According to another embodiment, in operation S1519, when the detection of the second fingerprint has been completed, the processor 120 may perform second additional authentication by using the second fingerprint and the first fingerprint.

Figure 16:
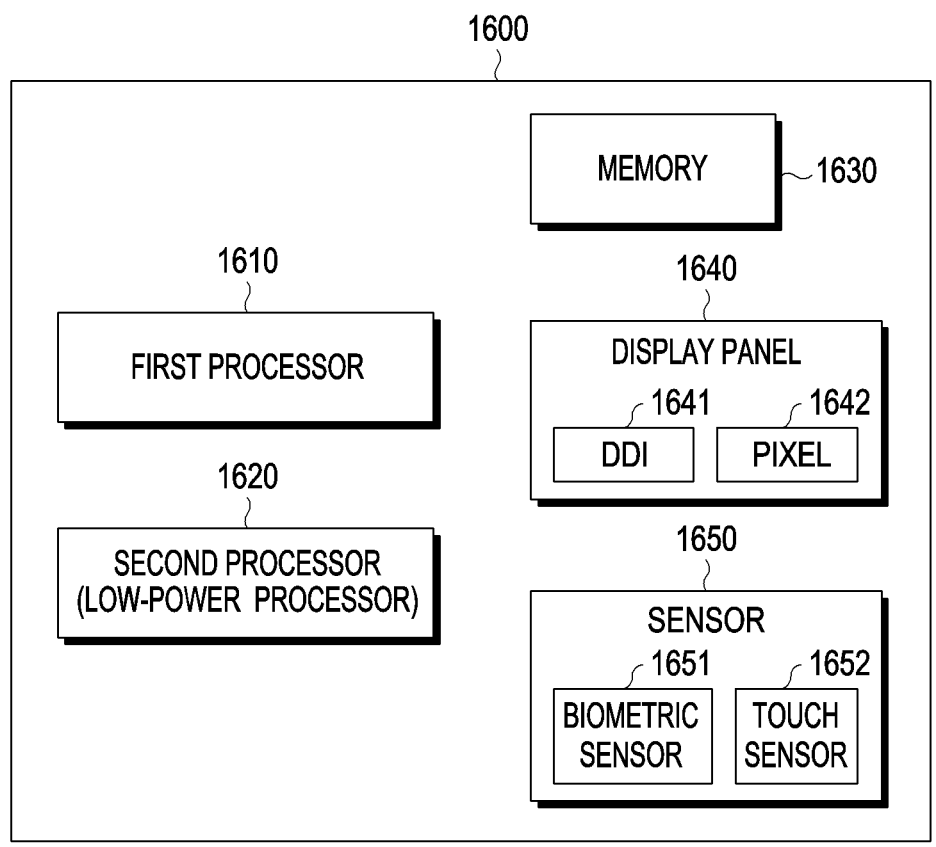
FIG. 16 illustrates an example of an electronic device according to another embodiment.

FIG. 16 illustrates an example of an electronic device according to another embodiment.

For example, the electronic device 1600 illustrated in FIG. 16 may be the electronic device (e.g., the electronic device 101) of FIG. 1, the electronic device (e.g., the electronic device 201) of FIG. 2, the electronic device (e.g., the electronic device 700) of FIG. 7, or the electronic device (the electronic device 900) of FIG. 9, and may include the program module of FIG. 3. As illustrated in FIG. 16, according to another embodiment, the electronic device may include at least one processor (e.g., a first processor 1610 or a second processor 1620), a memory 1630, a display panel 1640, or at least one sensor 1650.

According to another embodiment, the first processor 1610 may control overall operations of the electronic device. For example, in a case where the electronic device is in a sleep state, without waking-up the first processor 1610, the second processor 1620 (e.g., a low-power processor or a sensor HUB) may process sensor information acquired through the at least one sensor 1650 or an input acquired from a user.

According to another embodiment, the second processor 1620 may control a biometric sensor 1651, a touch sensor 1652, or the display panel 1640 independently of the first processor 1610.

According to another embodiment, the electronic device may include the memory 1630. For example, the memory 1630 may include a normal area for storing a user application and the like, or a secure area for storing information sensitive to security such as information for fingerprint sensing and the like.

According to another embodiment, the display panel 1640 may include a pixel unit 1642 including multiple pixels, and a display driving module 1641 (e.g., a display driver IC (DDI 1641)) configured to provide display information by controlling at least some of the multiple pixels included in the pixel unit 1642.

According to another embodiment, the sensor 1650 may include the biometric sensor 1651 (e.g., a fingerprint sensor) configured to detect a user's fingerprint on the display panel 1640, or the touch sensor 1652 configured to detect the user's touch on the display panel 1640.

According to another embodiment, the biometric sensor 1651 may include an optical fingerprint sensor (e.g., an image sensor) configured to use light, which is output from the display module, as a light source.

According to another embodiment, the at least one sensor 1650 may drive multiple pixels, included in the pixel unit 1642, through the display driving module 1641 in response to a user input.

According to another embodiment, the at least one sensor 1650 may control the display panel 1640 as needed. For example, the biometric sensor 1651 may use the light emitted from the display by controlling the display panel 1640 to acquire the user's biometric information.

Figure 17:
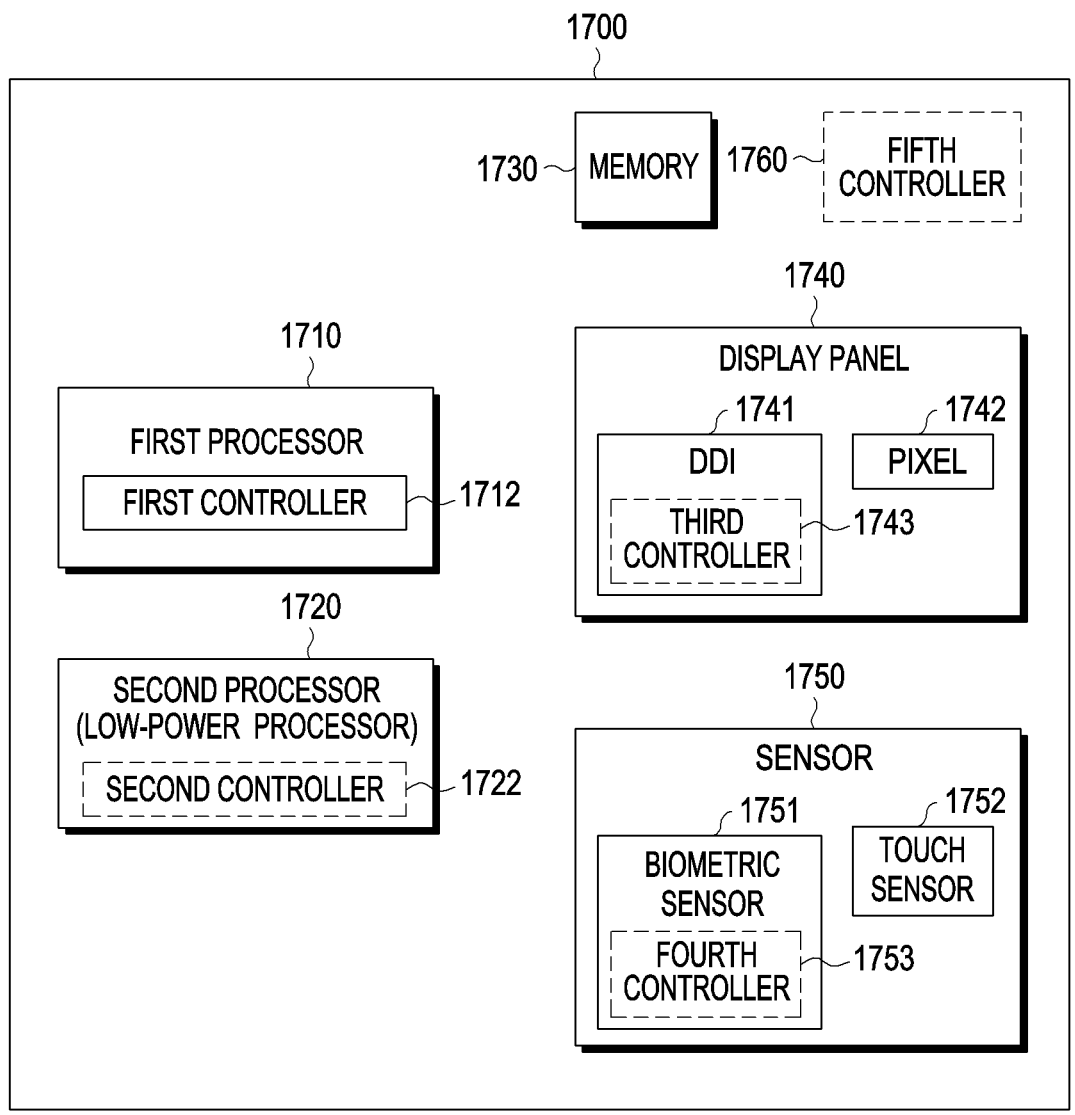
FIG. 17 illustrates another embodiment of an electronic device according to still another embodiment.

FIG. 17 illustrates another embodiment of an electronic device according to still another embodiment.

For example, the electronic device 1700 illustrated in FIG. 17 may be the electronic device (e.g., the electronic device 101) of FIG. 1, the electronic device (e.g., the electronic device 201) of FIG. 2, the electronic device (e.g., the electronic device 700) of FIG. 7, the electronic device (the electronic device 900) of FIG. 9, or the electronic device (the electronic device 1600) of FIG. 16, and may include the program module of FIG. 3. As illustrated in FIG. 17, according to still another embodiment, the electronic device may include multiple controllers (e.g., a first controller 1712, a second controller 1722, a third controller 1743, a fourth controller 1753, or a fifth controller 1760), and each controller may be included in a module (e.g., a first processor 1710, a second processor 1720, a DDI 1741, or a biometric sensor 1751) included in the electronic device. For example, the electronic device may control the first processor 1710 by using the first controller 1712, and may control the second processor 1720 by using the second controller 1722. For example, the electronic device may control modules, in which the third controller 1743 and the fourth controller 1753 are included, by using the third controller 1743 and the fourth controller 1753.

According to still another embodiment, the electronic device may control modules of the electronic device by using each controller. For example, the electronic device may control multiple controllers (e.g., the first controller 1712, the second controller 1722, the third controller 1743, and the fourth controller 1753) by using a main controller (e.g., the fifth controller 1760). Further, the electronic device may designate the main controller and may control other controllers under the control of the designated main controller. For example, the electronic device may change and/or designate the main controller from the fifth controller 1760 to the first controller 1712 and may control other controllers by using the designated main controller.

According to still another embodiment, the electronic device may directly control modules of the electronic device by using each controller. For example, the electronic device may control the second processor 1720, the memory 1730, the display panel 1740, and/or at least one sensor 1750 by using the first controller 1712 included in the first processor 1710.

According to still another embodiment, one controller may control the display panel 1740 and the at least one sensor 1750. For example, in the case of an optical fingerprint sensor configured to use the display panel 1740 as a light source, the one controller may control the display panel 1740 and the sensor 1750, and a user's biometric information may be easily acquired.

According to still another embodiment, the display panel 1740 may include a pixel unit 1742 including multiple pixels, and a display driving module 1741 (e.g., a display driver IC (DDI 1741)) configured to provide display information by controlling at least some of the multiple pixels included in the pixel unit 1742.

According to still another embodiment, the sensor 1750 may include the biometric sensor 1751 (e.g., a fingerprint sensor) configured to detect a user's fingerprint on the display panel 1740, or the touch sensor 1752 configured to detect the user's touch on the display panel 1740.

An electronic device according to various embodiments of the disclosure may include: a first sensor configured to detect a first fingerprint; a second sensor; and a processor configured to be electrically connected to the first sensor and the second sensor, perform authentication of the first fingerprint by using the first fingerprint, and perform additional authentication by using at least a part of a second fingerprint detected through the second sensor, according to a result of the authentication of the first fingerprint.

According to various embodiments, the first sensor and the second sensor may be disposed on the same plane.

According to various embodiments, one surface of the first sensor may come in contact with one surface of the second sensor.

According to various embodiments, the second sensor may be disposed below the first sensor.

Figure 18A:
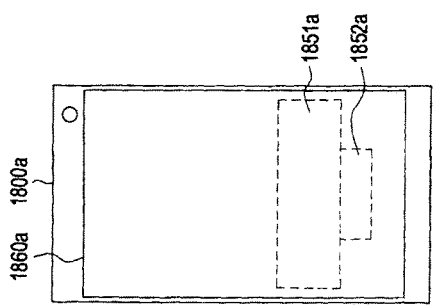
FIGS. 18A to 18C each illustrate a front surface of an electronic device according another embodiment.
Figure 18B:
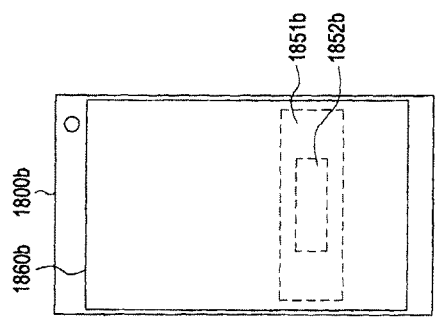
Figure 18C:
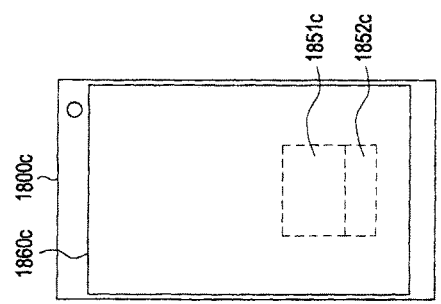

FIGS. 18A to 18C each illustrate a front surface of an electronic device according another embodiment.

For example, each of the electronic device 1800a of FIG. 18A, the electronic device 1800b of FIG. 18B, and the electronic device 1800c of FIG. 18C may be the electronic device (e.g., the electronic device 101) of FIG. 1, the electronic device (e.g., the electronic device 201) of FIG. 2, the electronic device (e.g., the electronic device 700) of FIG. 7, the electronic device (the electronic device 900) of FIG. 9, the electronic device (the electronic device 1600) of FIG. 16, or the electronic device (the electronic device 1700) of FIG. 17, and may include the program module of FIG. 3. As illustrated in FIG. 18A, according another embodiment, the electronic device 1800a may include: a display 1860a; an auxiliary sensor 1852a disposed to overlap a lower part of the display 1860a; and a main sensor 1851a having a width and an area larger than those of the auxiliary sensor 1852a and disposed not to overlap the auxiliary sensor 1852a on the same plane.

As illustrated in FIG. 18B, according another embodiment, the electronic device 1800b may include: a display 1860b; an auxiliary sensor 1852b disposed to overlap a lower part of the display 1860b; and a main sensor 1851b having a width and an area larger than those of the auxiliary sensor 1852b and disposed to overlap a lower part of the auxiliary sensor 1852b.

As illustrated in FIG. 18C, according another embodiment, the electronic device 1800c may include: a display 1860c; an auxiliary sensor 1852c disposed to overlap a lower part of the display 1860c; and a main sensor 1851c having a larger width than that of the auxiliary sensor 1852c and the same area as that of the auxiliary sensor 1852c and disposed not to overlap the auxiliary sensor 1852c on the same plane.

Each of the auxiliary sensors of FIGS. 18A to 18C may be, for example, an optical sensor or a capacitive sensor, and each of the main sensors thereof may be an ultrasonic sensor or a multispectral sensor.

FIGS. 19A to 19D each illustrate a lateral surface of an electronic device according to another embodiment.

Figure 19A:
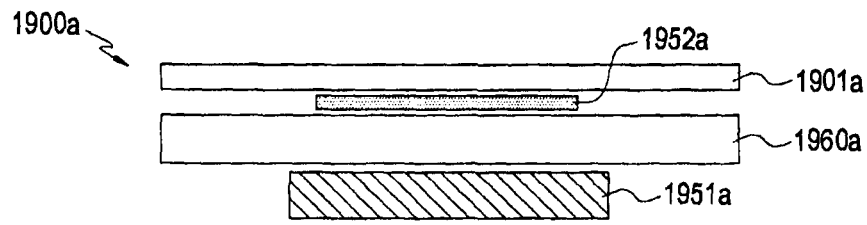
FIGS. 19A to 19D each illustrate a lateral surface of an electronic device according to another embodiment.
Figure 19B:
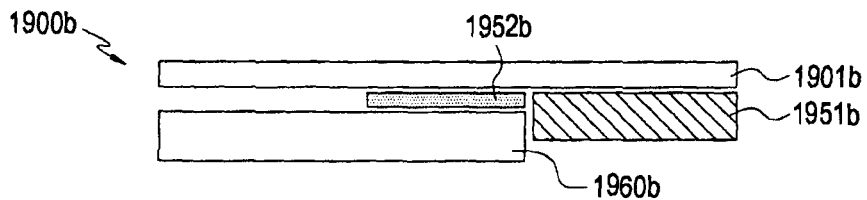
Figure 19C:
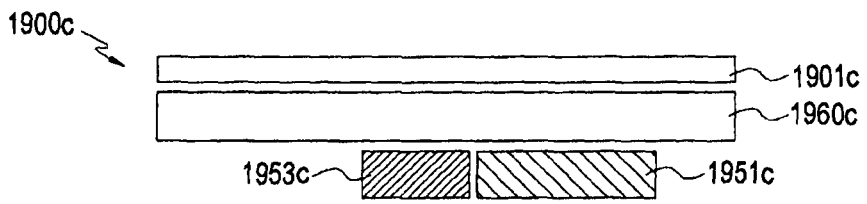
Figure 19D:
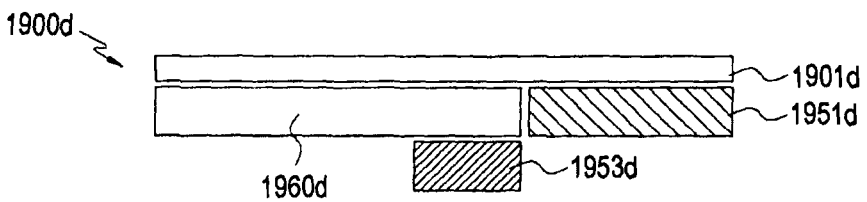

For example, each of the electronic device 1900a of FIG. 19A, the electronic device 1900b of FIG. 19B, the electronic device 1900c of FIG. 19C, and the electronic device 1900d of FIG. 19D may be the electronic device (e.g., the electronic device 101) of FIG. 1, the electronic device (e.g., the electronic device 201) of FIG. 2, the electronic device (e.g., the electronic device 700) of FIG. 7, the electronic device (the electronic device 900) of FIG. 9, the electronic device (the electronic device 1600) of FIG. 16, the electronic device (the electronic device 1700) of FIG. 17, the electronic device 1800a of FIG. 18A, the electronic device 1800b of FIG. 18B, or the electronic device 1800c of FIG. 18C. As illustrated in FIG. 19A, according to another embodiment, the electronic device 1900a may include: a protection glass membrane 1901a; a display 1960a disposed to entirely overlap a lower part of the protection glass membrane 1901a; an auxiliary sensor 1952a disposed between the protection glass membrane 1901a and the display 1960a; and a main sensor 1951a disposed below the display 1960a. For example, the auxiliary sensor may be a capacitive sensor, and the main sensor may be an ultrasonic sensor.

As illustrated in FIG. 19B, according to another embodiment, the electronic device 1900b may include: a protection glass membrane 1901b; a display 1960b disposed to partially overlap a lower part of the protection glass membrane 1901b; an auxiliary sensor 1952b disposed between the protection glass membrane 1901b and the display 1960b; and a main sensor 1951b disposed to overlap a lower part of the protection glass membrane 1901b but not to overlap the display 1960*b* and the auxiliary sensor 1952*b*. For example, the auxiliary sensor may be a capacitive sensor, and the main sensor may be an ultrasonic sensor.

As illustrated in FIG. 19C, according to another embodiment, the electronic device 1900*c* may include: a protection glass membrane 1901*c*; a display 1960*c* disposed to entirely overlap a lower part of the protection glass membrane 1901*c*; an auxiliary sensor 1952*c* disposed to partially overlap a lower part of the display 1960*c*; and a main sensor 1951*c* disposed to overlap a lower part of the display 1960*c* but not to overlap the auxiliary sensor 1953*c*. For example, the auxiliary sensor may be an optical sensor, and the main sensor may be an ultrasonic sensor.

As illustrated in FIG. 19D, according to another embodiment, the electronic device 1900*d* may include: a protection glass membrane 1901*d*; a display 1960*d* disposed to partially overlap a lower part of the protection glass membrane 1901*d*; an auxiliary sensor 1952*d* disposed to partially overlap a lower part of the display 1960*d*; and a main sensor 1951*d* disposed to overlap a lower part of the protection glass membrane 1901*d* but not to overlap the auxiliary sensor 1953*d* and the display 1960*d*. For example, the auxiliary sensor may be an optical sensor, and the main sensor may be an ultrasonic sensor.

FIGS. 20A, 20B, and 20C or 20D each illustrate an example of multiple sensors configured to detect fingerprints according to another embodiment.

Figure 20A:
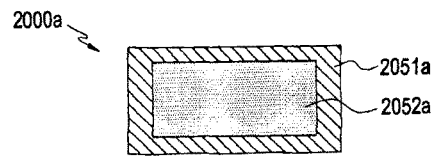
FIGS. 20A, 20B, and 20C or 20D each illustrate an example of multiple sensors configured to detect fingerprints according to another embodiment.
Figure 20B:
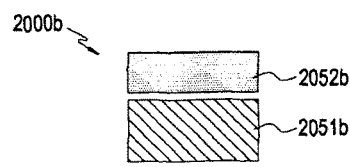
Figure 20C:
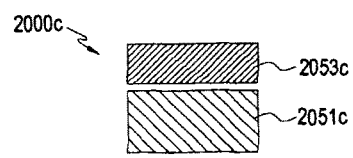
Figure 20D:
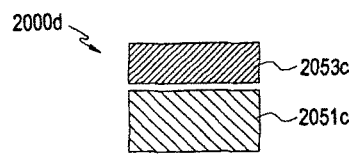

For example, each of an electronic device 2000*a* of FIG. 20A, an electronic device 2000*b* of FIG. 20B, an electronic device 2000*c* of FIG. 20C, and an electronic device 2000*d* of FIG. 20D may be the electronic device (e.g., the electronic device 101) of FIG. 1, the electronic device (e.g., the electronic device 201) of FIG. 2, the electronic device (e.g., the electronic device 700) of FIG. 7, the electronic device (the electronic device 900) of FIG. 9, the electronic device (the electronic device 1600) of FIG. 16, the electronic device (the electronic device 1700) of FIG. 17, the electronic device 1800*a* of FIG. 18A, the electronic device 1800*b* of FIG. 18B, the electronic device 1800*c* of FIG. 18C, the electronic device 1900*a* of FIG. 19A, the electronic device 1900*b* of FIG. 19B, the electronic device 1900*c* of FIG. 19C, or the electronic device 1900*d* of FIG. 19D. As illustrated in FIGS. 20A, 20B, and 20C or 20D, according to another embodiment, (A) in the case of FIG. 19A, an auxiliary sensor 2052*a* of the electronic device 2000*a* may be disposed to overlap a main sensor 2051*a* having a width and an area larger than those of the auxiliary sensor 2052*a*.

According to another embodiment, (B) in the case of FIG. 19B, an auxiliary sensor 2052*b* of the electronic device 2000*b* may be disposed in parallel with a main sensor 2051*b* having the same width as that of the auxiliary sensor 2052*b* but having an area larger than that of the auxiliary sensor 2052*b* so as not to overlap the main sensor 2051*b*.

According to another embodiment, (C) and (D) in the case of FIGS. 19C and 19D, an auxiliary sensor 2053*c* of each of the electronic devices 2000*c* and 2000*d* may be disposed in parallel with a main sensor 2051*c* having the same width as that of the auxiliary sensor 2053*c* but having an area larger than that of the auxiliary sensor so as not to overlap the main sensor.

Figure 21A:
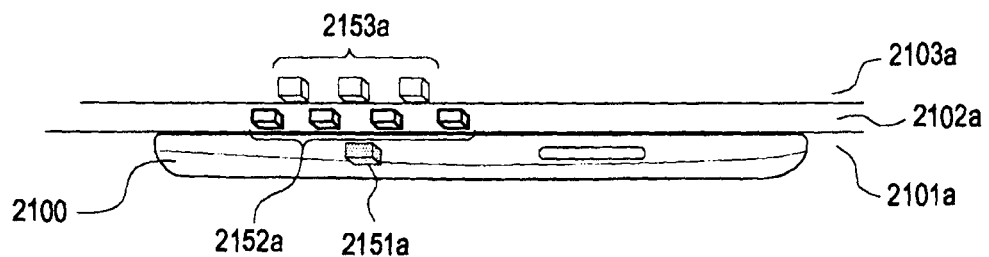
FIGS. 21A and 21B illustrate another example of multiple sensors configured to detect fingerprints according to still another embodiment.
Figure 21B:
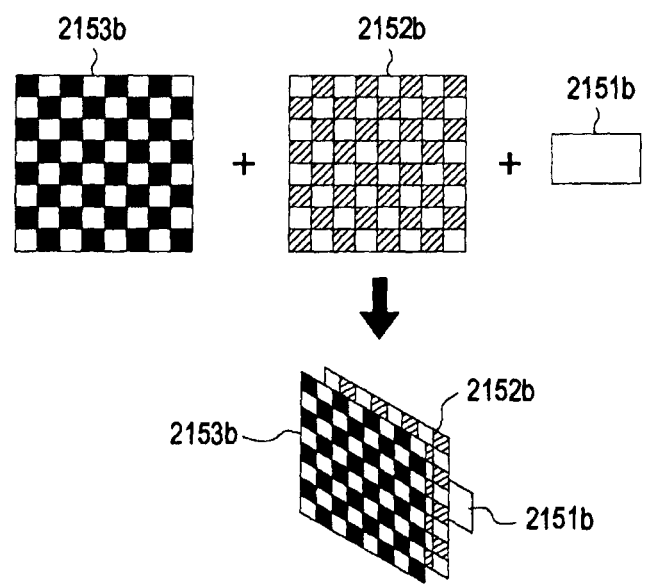

FIGS. 21A and 21B illustrate another example of multiple sensors configured to detect fingerprints according to still another embodiment.

For example, the electronic device 2100 of FIG. 21A may be the electronic device (e.g., the electronic device 101) of FIG. 1, the electronic device (e.g., the electronic device 201) of FIG. 2, the electronic device (e.g., the electronic device 700) of FIG. 7, the electronic device (the electronic device 900) of FIG. 9, the electronic device (the electronic device 1600) of FIG. 16, the electronic device (the electronic device 1700) of FIG. 17, the electronic device 1800*a* of FIG. 18A, the electronic device 1800*b* of FIG. 18B, the electronic device 1800*c* of FIG. 18C, the electronic device 1900*a* of FIG. 19A, the electronic device 1900*b* of FIG. 19B, the electronic device 1900*c* of FIG. 19C, the electronic device 1900*d* of FIG. 19D, the electronic device 2000*a* of FIG. 20A, the electronic device 2000*b* of FIG. 20B, the electronic device 2000*c* of FIG. 20C, or the electronic device 2000*d* of FIG. 20D, and may include the program module of FIG. 3.

As illustrated in FIG. 21A, according to still another embodiment, in a first layer 2103*a* which is an uppermost layer of a lower part of a display (e.g., the display 160) of the electronic device 2100, pixel units 2153*a* of a capacitive sensor may be arranged at predetermined intervals, and together with this configuration, in a second layer 2102*a* which is a lower layer of the first layer 2103*a* among layers of the lower part of the display 160, pixel units 2152*a* of an optical sensor may be arranged at predetermined intervals so as not to overlap the pixel units 2153*a* of the capacitive sensor. Together with this configuration, in a third layer 2101*a* which is a lowermost layer among the layers of the lower part of the display 160, a pixel unit 2151*a* of a main sensor (an ultrasonic sensor or a multispectral sensor) may be arranged to partially overlap the pixel units 2153*a* of the capacitive sensor or the pixel units 2152*a* of the optical sensor.

As illustrated in FIG. 21B, according to still another embodiment, the pixel units 2153*b* of the capacitive sensor may be configured in the form of a first lattice pattern spaced by the size of a pixel unit from a first position at a left upper end. According to still another embodiment, the pixel units 2152*b* of the optical sensor may be configured in the form a second lattice pattern spaced by the size of a pixel unit from a second position which is not the first position at the left upper end but is located more to the right than the first position at the left upper end. According to still another embodiment, the pixel unit 2151*b* of the ultrasonic sensor may be located on a rear surface of the pixel units 2152*b* of the optical sensor which are located on a rear surface of the pixel units 2153*b* of the capacitive sensor.

According to still another embodiment, a processor (e.g., the processor 120) may: detect a first fingerprint by using the pixel units 2153*b* of the capacitive sensor which are arranged in the form of the first lattice pattern; simultaneously, detect a second fingerprint by using the pixel units 2152*b* of the optical sensor which are arranged in the form of the second lattice pattern; and simultaneously, detect a third fingerprint by using the pixel unit 2151*b* of the ultrasonic sensor located on the rear surface of the pixel units 2152*b* of the optical sensor which are located on the rear surface of the pixel units 2153*b* of the capacitive sensor. For example, the processor 120 may perform additional authentication by using the first fingerprint, the second fingerprint, and/or the third fingerprint.

Figure 22:
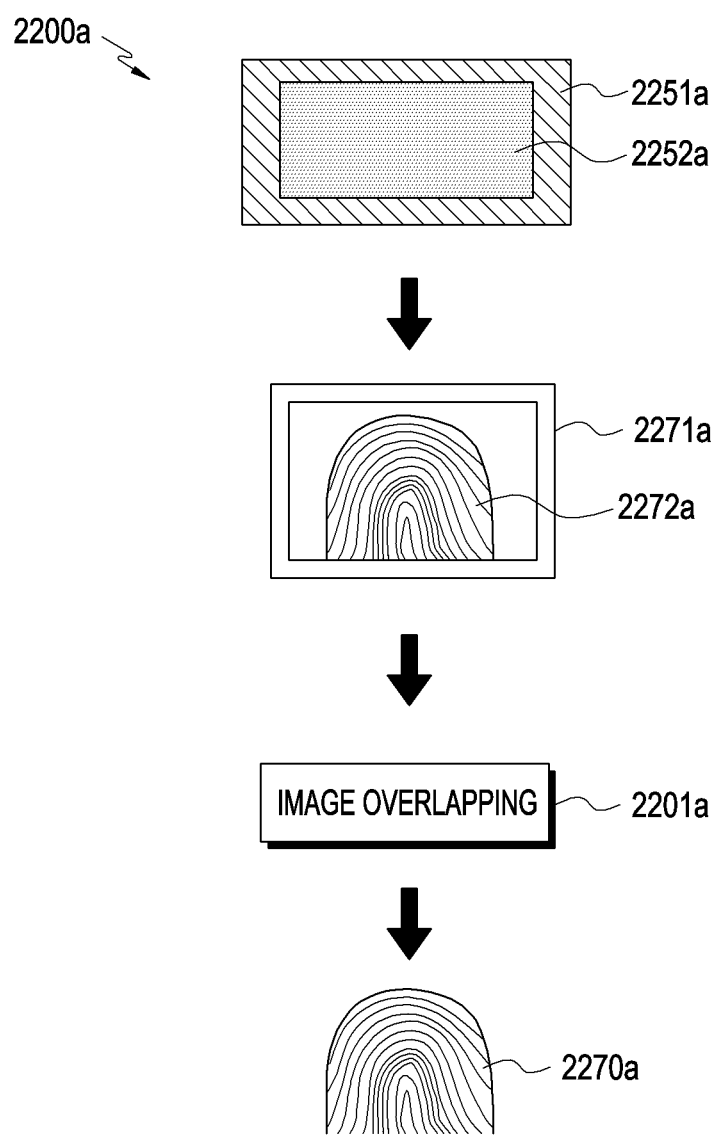
FIG. 22 illustrates an example of an operation of synthesizing fingerprints detected by multiple sensors according to another embodiment.

FIG. 22 illustrates an example of an operation of synthesizing fingerprints detected by multiple sensors according to another embodiment.

For example, an electronic device 2200*a* of FIG. 22 may be the electronic device (e.g., the electronic device 101) of FIG. 1, the electronic device (e.g., the electronic device 201) of FIG. 2, the electronic device (e.g., the electronic device 700) of FIG. 7, the electronic device (the electronic device 900) of FIG. 9, the electronic device (the electronic device 1600) of FIG. 16, the electronic device (the electronic device 1700) of FIG. 17, the electronic device 1800a of FIG. 18A, the electronic device 1800b of FIG. 18B, the electronic device 1800c of FIG. 18C, the electronic device 1900a of FIG. 19A, the electronic device 1900b of FIG. 19B, the electronic device 1900c of FIG. 19C, the electronic device 1900d of FIG. 19D, the electronic device 2000a of FIG. 20A, the electronic device 2000b of FIG. 20B, the electronic device 2000c of FIG. 20C, the electronic device 2000d of FIG. 20D, or the electronic device (the electronic device 2100) of FIG. 21A, and may include the program module of FIG. 3. As illustrated in FIG. 22, according to another embodiment, (A) when the auxiliary sensor and the main sensor are configured to overlap each other as in FIG. 19A, if a similarity between the first fingerprint detected through the auxiliary sensor and the pre-stored reference fingerprint is greater than the first similarity value and is less than or equal to the second similarity value as in operation S1511 of FIG. 15, while detecting a first fingerprint 2272a through an auxiliary sensor 2252a, a process (e.g., the processor 120) of the electronic device 2200a may detect at least a part of a second fingerprint through a main sensor 2251a overlapping the auxiliary sensor 2252a.

For example, the processor 120 may perform an image overlapping operation (as indicated by reference numeral 2201a) on an entire region of the first fingerprint 2272a detected through the auxiliary sensor 2252a and an entire region of at least a part 2271a of the second fingerprint detected through the main sensor 2251a, and thus may acquire an overlapping synthesis fingerprint 2270a having a form in which the first fingerprint 2272a overlaps the at least a part 2271a of the second fingerprint.

For example, the processor 120 may perform first additional authentication by using the acquired overlapping synthesis fingerprint 2270a. For example, the processor 120 may acquire a similarity between the overlapping synthesis fingerprint 2270a and a reference fingerprint, and when the similarity between the overlapping synthesis fingerprint 2270a and if the reference fingerprint is greater than a third similarity value, may determine that the authentication is successful.

Figure 23:
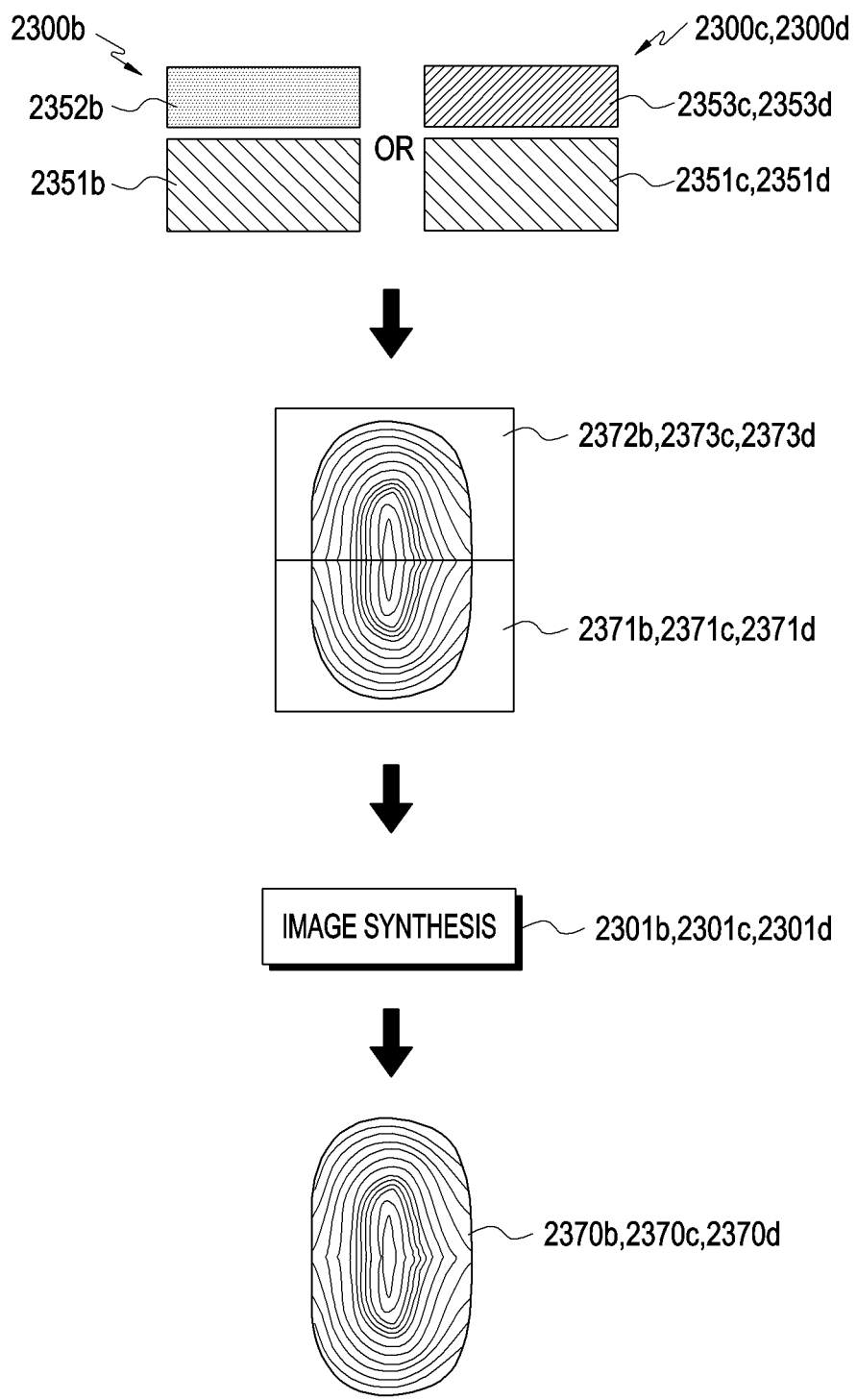
FIG. 23 illustrates another embodiment of an operation of synthesizing fingerprints detected by multiple sensors according to still another embodiment.

FIG. 23 illustrates another embodiment of an operation of synthesizing fingerprints detected by multiple sensors according to still another embodiment.

For example, an electronic device 2300b, an electronic device 2300c, and an electronic device 2300d of FIG. 23 may be the electronic device (e.g., the electronic device 101) of FIG. 1, the electronic device (e.g., the electronic device 201) of FIG. 2, the electronic device (e.g., the electronic device 700) of FIG. 7, the electronic device (the electronic device 900) of FIG. 9, the electronic device (the electronic device 1600) of FIG. 16, the electronic device (the electronic device 1700) of FIG. 17, the electronic device 1800a of FIG. 18A, the electronic device 1800b of FIG. 18B, the electronic device 1800c of FIG. 18C, the electronic device 1900a of FIG. 19A, the electronic device 1900b of FIG. 19B, the electronic device 1900c of FIG. 19C, the electronic device 1900d of FIG. 19D, the electronic device 2000a of FIG. 20A, the electronic device 2000b of FIG. 20B, the electronic device 2000c of FIG. 20C, the electronic device 2000d of FIG. 20D, the electronic device (the electronic device 2100) of FIG. 21A, or the electronic device (the electronic device 2200a) of FIG. 22, and may include the program module of FIG. 3. As illustrated in FIG. 23, according to still another embodiment, (B) in the case of FIG. 19B, (C) in the case of FIGS. 19C, and (D) in the case of FIG. 19D, in which the auxiliary sensor and the main sensor are configured such that the former and the latter do not overlap each other and are disposed on the same plane, if a similarity between the first fingerprint detected through the auxiliary sensor and the pre-stored reference fingerprint is greater than the first similarity value and is less than or equal to the second similarity value as in operation S1511 of FIG. 15, while detecting first fingerprints 2372b, 2373c, and 2373d through auxiliary sensors 2352b, 2353c, and 2353d, a processor (e.g., the processor 120) of the electronic device 2300a may detect at least parts 2371b, 2371c, and 2371d of the second fingerprint through main sensors 2351b, 2351c, and 2351d overlapping the auxiliary sensors 2352b, 2353c, and 2353d.

For example, the processor 120 may: configure, as a first region, an entire region of the first fingerprints 2372b, 2373c, and 2373d detected through the auxiliary sensors 2352b, 2353c, and 2353d; configure, as a second region, an entire region of the at least parts 2371b, 2371c, and 2371d of the second fingerprint detected through the main sensors 2351b, 2351c, and 2351d; perform an image synthesis operation (as indicated by reference numerals 2301b, 2301c, and 2301d) of synthesizing, in parallel, the first region and the second region; and thus acquire an additional synthesis fingerprint 2370a, 2370c, and 2370d configured such that the first fingerprints 2372b, 2373c, and 2373d are synthesized with the at least parts 2371b, 2371c, and 2371d of the second fingerprint so as to have an additional form.

For example, the processor 120 may perform first additional authentication by using the acquired additional synthesis fingerprint 2370a, 2370c, and 2370d. For example, the processor 120 may acquire a similarity between the additional synthesis fingerprint 2370a, 2370c, and 2370d and a reference fingerprint, and when the similarity between the additional synthesis fingerprint 2370a, 2370c, and 2370d and the reference fingerprint is greater than a third similarity value, may determine that the authentication is successful.

Figure 24:
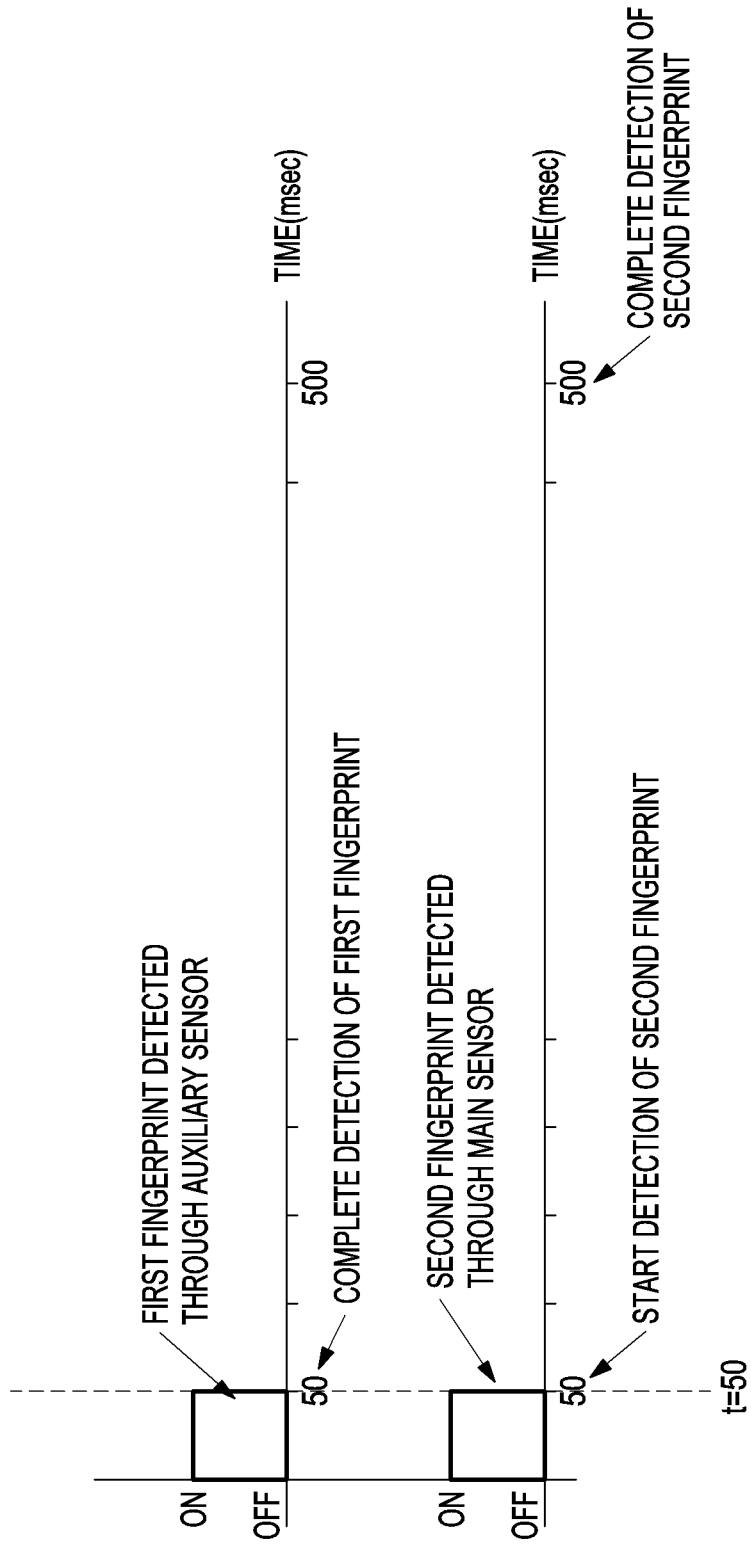
FIG. 24 illustrates an example of a process for detecting fingerprints by multiple sensors according to another embodiment.

FIG. 24 illustrates an example of a process for detecting fingerprints by multiple sensors according to another embodiment.

As illustrated in FIG. 24, according to another embodiment, after detection of a first fingerprint and detection of a second fingerprint are first started at a time point of t=0 ms, at a time point of t=50 ms, a processor (e.g., the processor 120) may detect the first fingerprint within 50 ms through an auxiliary sensor. For example, the processor 120 may not detect the second fingerprint within 50 ms through a main sensor, and may complete the detection of the second fingerprint at a time point at which 500 ms passes.

Figure 25:
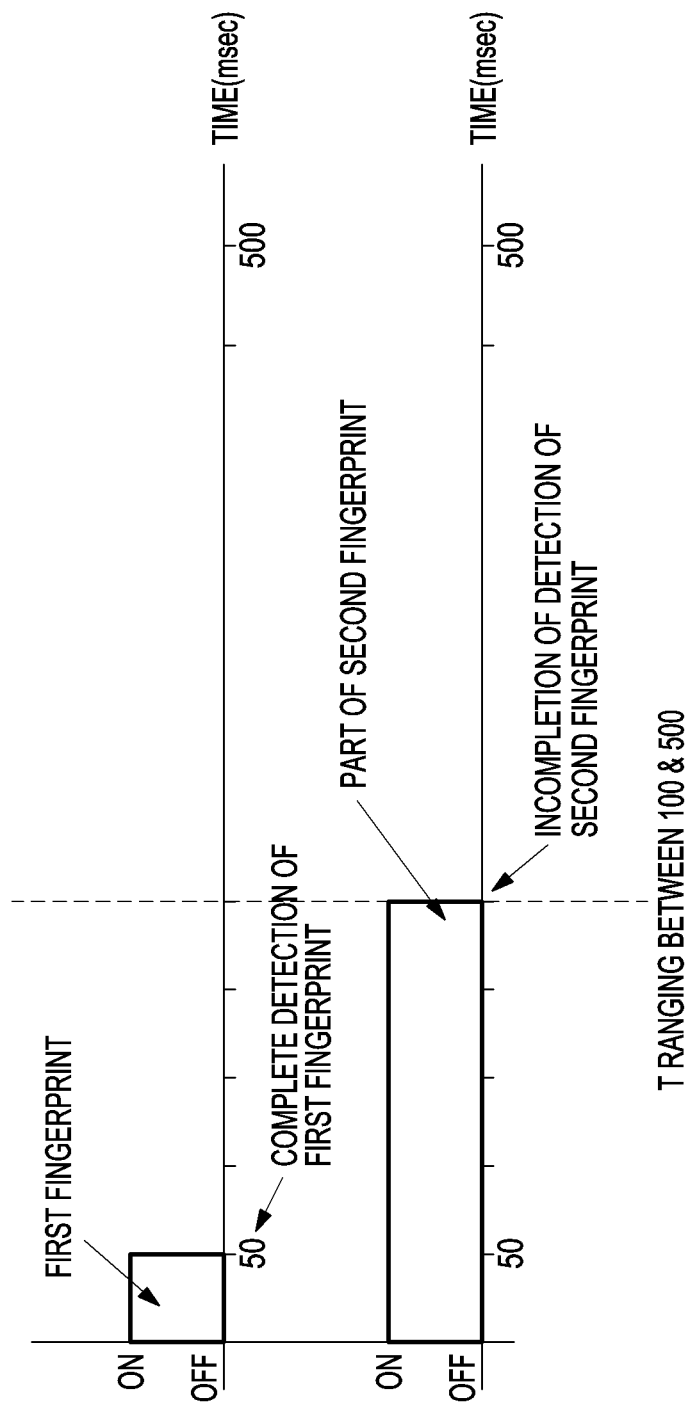
FIG. 25 illustrates another example of a process for detecting fingerprints by multiple sensors according to still another embodiment.

FIG. 25 illustrates another example of a process for detecting fingerprints by multiple sensors according to still another embodiment.

As illustrated in FIG. 25, according to still another embodiment, after detection of a first fingerprint and detection of a second fingerprint are first started at a time point of t=0 ms, at a time point t between 100 ms and 500 ms, a processor (the processor 120) may complete the detection of the first fingerprint within 50 ms through an auxiliary sensor, but may detect a part of the second fingerprint in a state in which the detection of the second fingerprint through a main sensor is not completed.

Figure 26:
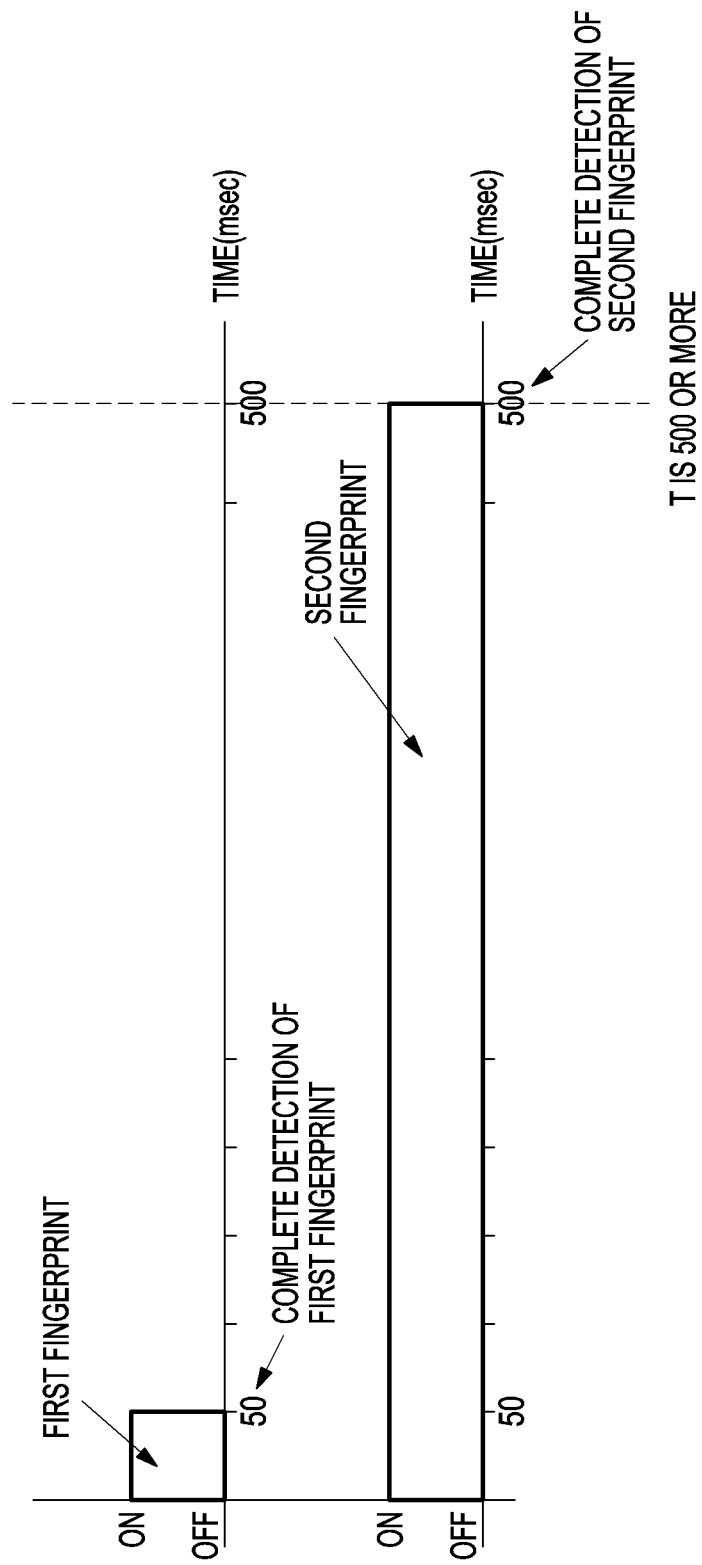
FIG. 26 illustrates still another embodiment of a process for detecting fingerprints by multiple sensors according to yet another embodiment.

FIG. 26 illustrates still another embodiment of a process for detecting fingerprints by multiple sensors according to yet another embodiment.

As illustrated in FIG. 26, according to yet another embodiment, after detection of a first fingerprint and detection of a second fingerprint are first started at a time point of t=0 ms, at a time point at which t=500 ms passes, a processor (e.g., the processor 120) may complete the detection of the first fingerprint within 50 ms through an auxiliary sensor, and may also complete detection of the second fingerprint through a main sensor.

According to yet another embodiment, the processor 120 may detect the first fingerprint within 50 ms through the auxiliary sensor, and when a state-of-charge of a battery is greater than or equal to a threshold voltage value, may activate the main sensor in advance so as to detect the first fingerprint, and simultaneously may start detection of the second fingerprint through the main sensor, wherein a time point at which the detection of the second fingerprint is started may correspond to a time point of t=50 ms of FIG. 24 among FIGS. 24 to 26.

According to yet another embodiment, the processor 120 may compare the first fingerprint with a reference fingerprint, and when a similarity between the first fingerprint and the reference fingerprint is greater than a first similarity value, may determine whether an application, in which fingerprint authentication has been requested, has a security level higher than a threshold level. For example, when the application, in which the fingerprint authentication has been requested, has a security level lower than or equal to the threshold level, the processor 120 may determine whether the similarity between the first fingerprint and the reference fingerprint is greater than the first similarity value and is less than a second similarity value. For example, when the similarity between the first fingerprint and the reference fingerprint has a value between the first similarity value and the second similarity value, the processor 120 may perform first additional authentication by using both a part of the second fingerprint and the first fingerprint detected to the current time point, wherein t representing a time point of execution of the first additional authentication may correspond to a time point t between 100 ms and 500 ms in FIG. 25 among FIGS. 24 to 26.

According to yet another embodiment, when as a result of the first additional authentication, a similarity between at least a part of the second fingerprint and the reference fingerprint is less than a third similarity value and a similarity between the first fingerprint and the reference fingerprint is less than the third similarity value, or when the application has a security level higher than the threshold level, the processor 120 may detect the second fingerprint through the main sensor, and may perform second additional authentication by using both the second fingerprint and the first fingerprint, wherein a time point of execution of the second additional authentication may correspond to a time point at which t=500 ms passes in FIG. 26 among FIGS. 24 to 26.

Figure 27:
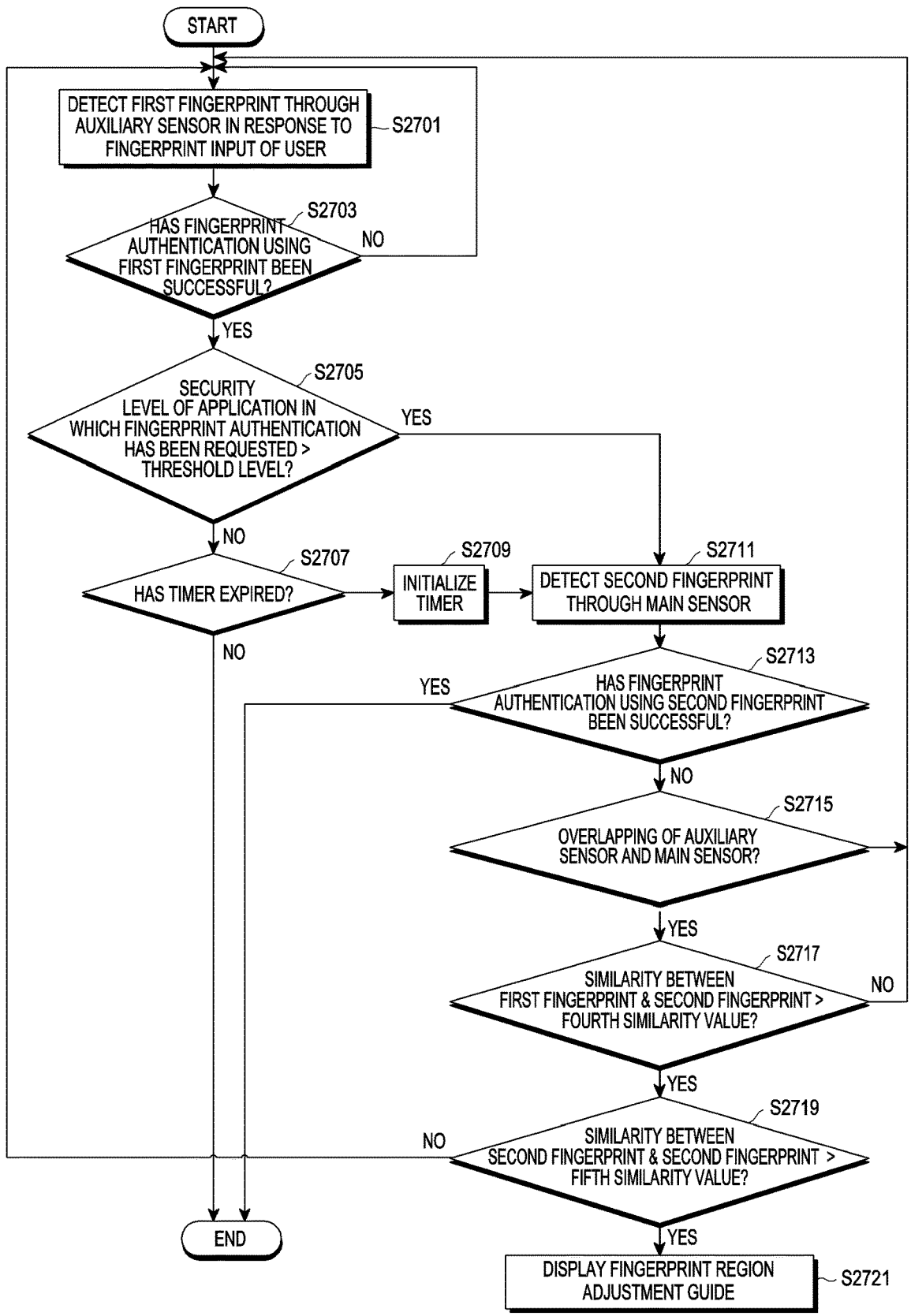
FIG. 27 illustrates a fingerprint authentication method of an electronic device according to still another embodiment.

FIG. 27 illustrates a fingerprint authentication method of an electronic device according to still another embodiment.

As illustrated in FIG. 27, according to still another embodiment, in operation S2701, a processor (e.g., the processor 120) may detect a first fingerprint through an auxiliary sensor in response to a fingerprint input of a user.

For example, the auxiliary sensor may be an optical sensor or a capacitive sensor as described above.

According to still another embodiment, in operation S2703, the processor 120 may determine whether fingerprint authentication using the first fingerprint has been successful.

For example, when a similarity between the detected first fingerprint and a pre-stored reference fingerprint is greater than or equal to a predetermined similarity value, the processor 120 may determine that the fingerprint authentication of the first fingerprint has been successful.

According to still another embodiment, when it is determined that the fingerprint authentication of the first fingerprint has failed, in operation S2701, the processor 120 may newly detect the first fingerprint through the auxiliary sensor.

According to still another embodiment, when it is determined that the fingerprint authentication of the first fingerprint has been successful, in operation S2705, the processor 120 may determine whether an application, in which the fingerprint authentication has been requested, has a security level higher than a threshold level.

According to still another embodiment, when the application, in which the fingerprint authentication has been requested, is determined to have a security level lower than the threshold level, in operation S2707, the processor 120 may determine whether a timer has expired.

For example, the processor 120 may determine, as a threshold time of the timer, a value divided by a value corresponding to a current state-of-charge of a battery.

For example, the processor 120 may determine whether the timer initialized before operation S2701 has expired.

For example, when it is determined that the timer has not expired, the processor 120 determines whether the fingerprint authentication of the first fingerprint has been successful, and thus terminates an authentication operation.

According to still another embodiment, when it is determined that the timer has expired in operation S2709 the processor 120 may initialize the timer.

For example, when fingerprint authentication is subsequently requested by the user while the timer is initialized, the processor 120 determines that a fingerprint authentication request of the user before expiration of the timer is a safe fingerprint request, and thus immediately terminates the fingerprint authentication operation. In contrast, the processor 120 determines that a fingerprint authentication request of the user after expiration of the timer is a fingerprint request which needs a determination of whether the fingerprint authentication request is safe, and thus, without immediately terminating the fingerprint authentication operation, as in operations S2711 to S2719, the processor 120 may again perform authentication through the main sensor.

According to still another embodiment, in operation S2711, the processor 120 may detect a second fingerprint through the main sensor.

For example, the main sensor may be an ultrasonic sensor or a multispectral sensor as described above.

According to still another embodiment, in operation S2713, the processor 120 may determine whether fingerprint authentication using the second fingerprint has been successful.

For example, the processor 120 may determine whether a similarity between the second fingerprint and the reference fingerprint is greater than a predetermined similarity value, and when the similarity between the second fingerprint and the reference fingerprint is greater than the predetermined similarity value, the processor 120 may determine that the fingerprint authentication has been successful.

According to still another embodiment, when it is determined that the fingerprint authentication performed using the second fingerprint has been successful the processor 120 may determine that the fingerprint authentication has been completed and thus may terminate an operation.

According to still another embodiment, when it is determined that the fingerprint authentication performed using the second fingerprint has failed, in operation S2715, the processor 120 may determine whether the auxiliary sensor and the main sensor are arranged to overlap a lower part of a display (e.g., the display 160).

According to still another embodiment, when it is determined that the auxiliary sensor and the main sensor are not arranged to overlap the lower part of the display 160, the processor 120 may determine that an additional authentication operation as in operation S2717 and operation S2719 cannot be performed, and thus may newly detect the first fingerprint through the auxiliary sensor as in operation S2701.

According to still another embodiment, when it is determined that the auxiliary sensor and the main sensor are arranged to overlap the lower part of the display 160, in operation S2717, the processor 120 may determine whether a similarity between the first fingerprint detected through the auxiliary sensor and the second fingerprint detected through the main sensor disposed to overlap the auxiliary sensor is greater than a fourth similarity value which is a predetermined threshold.

According to still another embodiment, when the similarity between the first fingerprint detected through the auxiliary sensor and the second fingerprint detected through the main sensor disposed to overlap the auxiliary sensor is less than the fourth similarity value which is the predetermined threshold, in operation S2701, the processor 120 may newly detect the first fingerprint of the user's finger.

According to still another embodiment, when the similarity between the first fingerprint detected through the auxiliary sensor and the second fingerprint detected through the main sensor disposed to overlap the auxiliary sensor is greater than the fourth similarity value which is the predetermined threshold, in operation S2719, the processor 120 may determine whether a similarity between the second fingerprint and the reference fingerprint is greater than a fifth similarity value which a predetermined threshold.

For example, when the first fingerprint is similar to the second fingerprint and the second fingerprint is similar to the reference fingerprint, it may be determined that the user's fingerprint itself is close to the reference fingerprint but the position of the user's finger is incorrect and thus the fingerprint authentication has failed.

As another example, when the first fingerprint is similar to the second fingerprint but the second fingerprint is not similar to the reference fingerprint, it may be determined that the position of the user's finger is incorrect and the user's fingerprint itself is also an incorrect fingerprint.

Therefore, according to still another embodiment, when it is determined that the similarity between the second fingerprint and the reference fingerprint is greater than the fifth similarity value which the predetermined threshold, in operation S2721, the processor 120 may display a fingerprint region adjustment guide, which allows the user to adjust the position of the user's fingerprint, on a display (e.g., the display 160).

Figure 28:
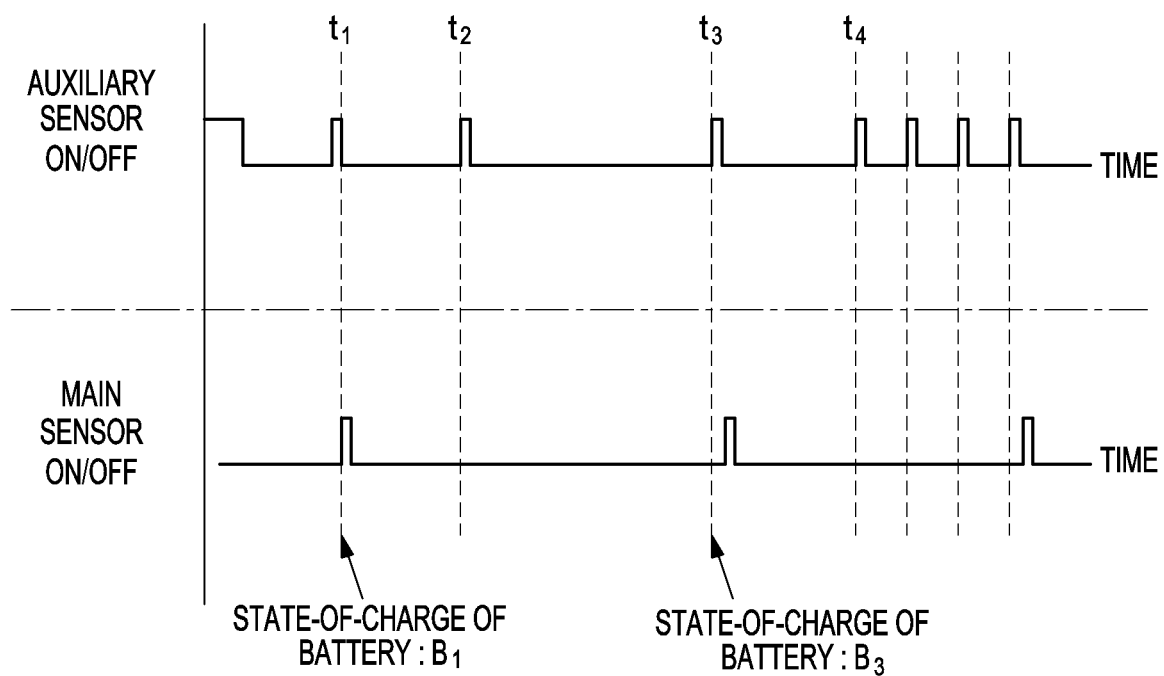
FIG. 28 illustrates an example of operations of multiple sensor modules configured to detect fingerprints according to another embodiment.

FIG. 28 illustrates an example of operations of multiple sensor modules configured to detect fingerprints according to another embodiment.

As illustrated in FIG. 28, according to another embodiment, a processor (e.g., the processor 120) may turn on an auxiliary sensor at a time point of $t=t_1$ and may detect a first fingerprint through the auxiliary sensor, according a fingerprint authentication request requested by a user before the time point of $t=t_1$. For example, after the processor 120 turns on the auxiliary sensor so as to detect the first fingerprint, the processor 120 succeeds in the fingerprint authentication using the first fingerprint, and when an application has a security level higher than or equal to a threshold level, may turn on a main sensor so as to detect a second fingerprint.

For example, after the processor 120 turns on the auxiliary sensor so as to detect the first fingerprint, the processor 120 succeeds in the fingerprint authentication using the first fingerprint, and when the application has a security level lower than or equal to the threshold level and a timer is in an expired state, may turn on the main sensor so as to detect the second fingerprint.

For example, while the processor 120 turns on the main sensor so as to detect the second fingerprint, the processor 120 may determine a threshold time value of the timer. For example, when the main sensor is turned on at the time point of $t=t_1$, the processor 120 may determine a first threshold time value by using a state-of-charge B1 of a battery at the time point of $t=t_1$. For example, when the main sensor is turned on at a time point of $t=t_3$, the processor 120 may determine a second threshold time value by using a state-of-charge B3 of the battery at a time point of $t=t_2$.

For example, after the first threshold time value is determined using the state-of-charge B1 of the battery at the time point of $t=t_1$, when a fingerprint authentication request of a user is generated at a time point of $t=t_2$ before the first threshold time passes, the processor 120 turns on only the auxiliary sensor and does not turn on the main sensor at the time point of $t=t_2$. For example, when the main sensor is turned on at the time point of $t=t_1$ the processor 120 may determine the first threshold time value by using the state-of-charge B1 of the battery at the time point of $t=t_1$.

For example, after the first threshold time value is determined using the state-of-charge B1 of the battery at the time point of $t=t_1$, when a fingerprint authentication request of the user is generated at a time point of $t=t_3$ after the first threshold time passes, at the time point $t=t_3$, the processor 120 may also turn on the main sensor while turning on the auxiliary sensor. For example, when the main sensor is turned on at the time point of $t=t_3$, the processor 120 may determine a second threshold time value by using the state-of-charge B3 of the battery at the time point of $t=t_2$.

Figure 29:
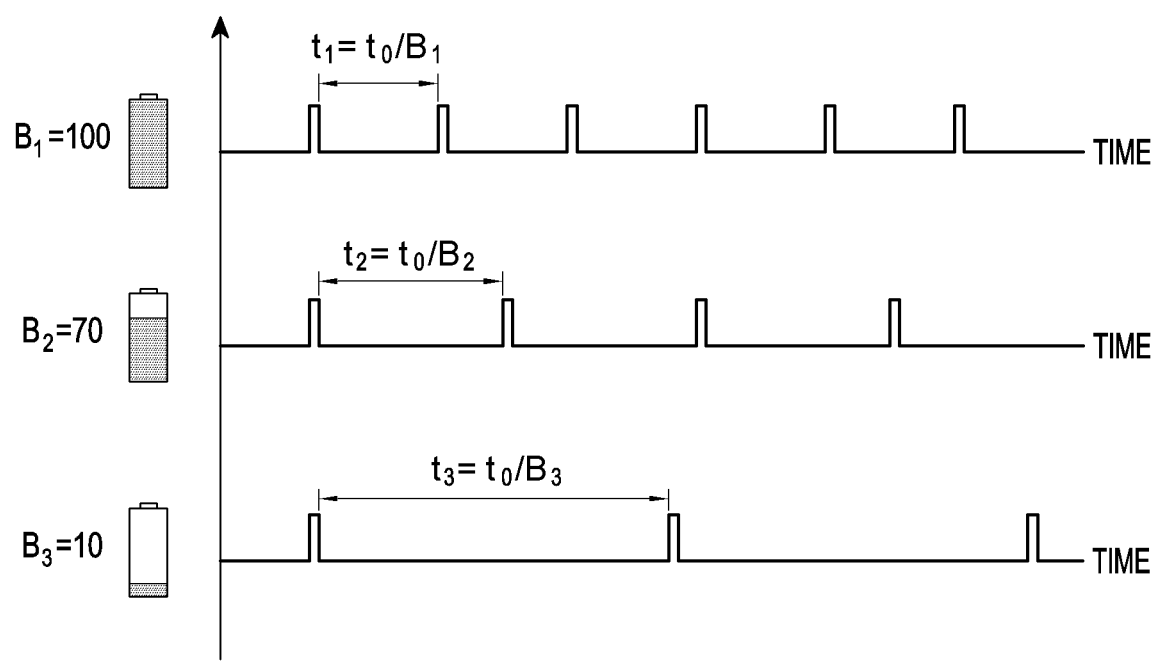
FIG. 29 illustrates another example of an operation of multiple sensor modules configured to detect fingerprints according to still another embodiment.

FIG. 29 illustrates another example of an operation of multiple sensor modules configured to detect fingerprints according to still another embodiment.

As illustrated in FIG. 29, according to still another embodiment, when a timer is initialized, a processor (e.g., the processor 120) may turn on a main sensor while determining $t_1=t_0/100$ representing a threshold time value of the timer by using B1=100 representing a state-of-charge of a battery at a time point at which the timer initialized. For example, after a threshold time value of the timer is determined as $t_0/100$ and thus the timer is initialized, when an authentication request of a user is generated before a time of $t_0/100$ passes, the processor 120 turns on only an auxiliary sensor so as to detect a first fingerprint, and does not turn on the main sensor. For example, after a threshold time value of the timer is determined as $t_0/100$ and thus timer is initialized, when an authentication request of the user is generated after the time of $t_0/100$ passes, the processor 120 may turn on the auxiliary sensor and the main sensor so as to detect both the first fingerprint and a second fingerprint.

According to still another embodiment, when the timer is initialized, the processor 120 may turn on the main sensor while determining a threshold time value of the timer as $t_2=t_0/70$ by using B2=70 representing a state-of-charge of the battery at a time point at which the timer is initialized. For example, after a threshold time value of the timer is determined as $t_0/70$ and thus the timer is initialized, when an authentication request of the user is generated before a time of $t_0/70$ passes, the processor 120 turns on only auxiliary sensor so as to detect the first fingerprint, and does not turn on the main sensor. For example, after a threshold time value of the timer is determined as $t_0/70$ and thus the timer is initialized, when an authentication request of the user is generated after the time of $t_0/70$ passes, the processor 120 may turn on both the auxiliary sensor and the main sensor so as to detect both the first fingerprint and the second fingerprint.

According to still another embodiment, when the timer is initialized, the processor 120 may turn on the main sensor while determining a threshold time value of the timer as $t_3=t_0/10$ by using B3=10 representing a state-of-charge of the battery at a time point at which the timer is initialized. For example, after a threshold time value of the timer is determined as $t_0/10$ and thus the timer is initialized, when an authentication request of the user is generated before a time of $t_0/10$ passes, the processor 120 turns on only the auxiliary sensor so as to detect the first fingerprint, and does not turn on the main sensor. For example, after a threshold time value of the timer is determined as $t_0/10$ and thus the timer is initialized, when an authentication request of the user is generated after a time of $t_0/10$ passes, the processor 120 may turn on both the auxiliary sensor and the main sensor so as to detect both the first fingerprint and the second fingerprint.

A control method of an electronic device according to various embodiments of the disclosure may include: detecting a first fingerprint through a first sensor; detecting a touch region corresponding to the first fingerprint through the second sensor; and performing fingerprint authentication by using multiple first images acquired to correspond to the first fingerprint, according to the touch region.

The control method of the electronic device according to various embodiments of the disclosure may include performing the fingerprint authentication according to a variance of the touch region.

The control method of the electronic device according to various embodiments of the disclosure may include performing the fingerprint authentication by using the first fingerprint when the variance is less than or equal to a threshold variance.

The control method of the electronic device according to various embodiments of the disclosure may include, when the variance is greater than or equal to the threshold variance, performing the fingerprint authentication by using the first fingerprint or the multiple first images, according to a security level of an application in which the fingerprint authentication has been requested.

The control method of the electronic device according to various embodiments of the disclosure may include performing the fingerprint authentication by using the first fingerprint or the multiple first images, according to a similarity between the multiple first images and multiple reference images generated at every first time interval so as to correspond to a pre-stored reference fingerprint.

The control method of the electronic device according to various embodiments of the disclosure may include performing the fingerprint authentication by using the first fingerprint when the similarity is greater than or equal to a set first similarity value.

The control method of the electronic device according to various embodiments of the disclosure may include performing the fingerprint authentication by using the multiple first images when the similarity has a value between a set second similarity value and the first similarity value.

The control method of the electronic device according to various embodiments of the disclosure may include performing the fingerprint authentication by using a result of comparison between at least one reference change image representing a difference between multiple reference images and at least one first change image representing a difference between the multiple first images.

A control method of an electronic device according to various embodiments of the disclosure may include: detecting a first fingerprint through a first sensor; performing authentication of the first fingerprint by using the first fingerprint; and performing authentication of at least a part of a second fingerprint detected through a second sensor, according to a result of the authentication of the first fingerprint.

What is claimed is:

1. An electronic device comprising:
   a display including a touch sensor;
   a fingerprint sensor disposed under at least a partial region of the touch sensor; and
   a processor,
   wherein the processor is configured to:
      control the fingerprint sensor to acquire fingerprint information of an external object;
      detect, through the touch sensor, a first region on the display in which a first touch input corresponding to the external object is received at a first time while the fingerprint information is being acquired;
      detect, through the touch sensor, a second region on the display in which a second touch input corresponding to the external object is received at a second time later than the first time while the fingerprint information is being acquired;
      detect a variance of the second region with respect to the first region;
      in response to identifying that the detected variance is equal to or less than a threshold, perform authentication of the external object by using the fingerprint information; and
      in response to identifying that the detected variance is greater than the threshold, perform authentication of the external object by using multiple first images, according to a similarity between the multiple first images and multiple reference images generated at first time intervals so as to correspond to a pre-stored reference fingerprint.

2. The electronic device of claim 1, wherein the processor is configured to:
   detect the multiple reference images through the fingerprint sensor; and
   store the multiple reference images detected through the fingerprint sensor.

3. The electronic device of claim 2, wherein the processor is configured to acquire the multiple first images of the external object when the variance is greater than the threshold.

4. A control method of an electronic device, the control method comprising:
   detecting a first fingerprint through a first sensor;
   detecting, through a second sensor, a first region on a display in which a first touch input corresponding to an external object is received at a first time while the first fingerprint is being detected;
   detecting, through the second sensor, a second region on the display in which a second touch input corresponding to the external object is received at a second time later than the first time while the first fingerprint is being acquired;
   detecting a variance of the second region with respect to the first region; and in response to identifying that the detected variance is equal to or less than a threshold, performing fingerprint authentication by using the first fingerprint; and in response to identifying that the detected variance is greater than the threshold, performing fingerprint authentication by using multiple first images, according to a similarity between the multiple first images and multiple reference images generated at first time intervals so as to correspond to a pre-stored reference fingerprint.

5. The control method of claim 4, further comprising:
when the variance is greater than the threshold, stopping an operation associated with the first fingerprint and displaying information related to a movement.

6. The control method of claim 4, further comprising performing the fingerprint authentication by using the first fingerprint when the similarity is greater than or equal to a set first similarity value.

7. The control method of claim 4, further comprising performing the fingerprint authentication by using the multiple first images when the similarity has a value between a set second similarity value and a first similarity value.

8. The control method of claim 7, further comprising performing the fingerprint authentication by using a result of comparison between at least one reference change image representing a difference between the multiple reference images and at least one first change image representing a difference between the multiple first images.

9. An electronic device comprising:
a display including a touch sensor;
a fingerprint sensor disposed under at least a partial region of the touch sensor; and
a processor electrically connected to the touch sensor and the fingerprint sensor,
wherein the processor is configured to:
control the fingerprint sensor to acquire fingerprint information of an external object;
detect a first region on the display in which a first touch input corresponding to the external object is received at a first time while the fingerprint information of the external object is being acquired;
detect a second region on the display in which a second input corresponding to the external object is received at a second time later than the first time while the fingerprint information of the external object is being acquired;
detect a variance of the second region with respect to the first region;

in response to identifying that the detected variance is equal to or less than a threshold, store the fingerprint information of the external object in a memory of the electronic device and perform authentication of the external object by using the fingerprint information; and in response to identifying that the detected variance is greater than the threshold, perform authentication of the external object by using multiple first images, according to a similarity between the multiple first images and multiple reference images generated at first time intervals so as to correspond to a pre-stored reference fingerprint.

10. The electronic device of claim 9, wherein the processor is configured to:
when the detected variance is greater than the threshold, stop an operation of acquiring the fingerprint information of the external object and provide information related to the detected variance.

11. The electronic device of claim 1, wherein the fingerprint sensor further comprises a main fingerprint sensor and an auxiliary fingerprint sensor.

12. The electronic device of claim 11, wherein the main fingerprint sensor is an ultrasonic sensor.

13. The electronic device of claim 12, wherein the auxiliary fingerprint sensor is a capacitive sensor or an optical sensor.

14. The electronic device of claim 11, wherein, to control the fingerprint sensor to acquire the fingerprint information of the external object, the processor is configured to control the auxiliary fingerprint sensor to initially acquire the fingerprint information without using the main fingerprint sensor.

15. The electronic device of claim 14, wherein the processor is configured to control the main fingerprint sensor to acquire the fingerprint information when state-of-charge of a battery of the electronic device is greater than or equal to a threshold voltage value.

16. The electronic device of claim 15, wherein, when the state-of-charge of the battery is less than the threshold voltage value, the processor is configured to control the main fingerprint sensor to acquire the fingerprint information when another similarity between the fingerprint information acquired by the auxiliary fingerprint sensor and the pre-stored reference fingerprint is greater than a similarity value and a security level of an application for which the authentication of the external object is requested is greater than a threshold level.

* * * * *